US012589606B2

(12) United States Patent
Nakamura et al.

(10) Patent No.: US 12,589,606 B2
(45) Date of Patent: Mar. 31, 2026

(54) INK RIBBON CARTRIDGE HAVING FIRST AND SECOND PROTRUSIONS TO BE FITTED IN FIRST AND SECOND HOLES OF FRAME OF PRINTING DEVICE, AND PRINTING DEVICE USING THE SAME

(71) Applicant: BROTHER KOGYO KABUSHIKI KAISHA, Nagoya (JP)

(72) Inventors: Yuya Nakamura, Nagoya (JP); Shinji Ukai, Kiyosu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 87 days.

(21) Appl. No.: 18/519,628

(22) Filed: Nov. 27, 2023

(65) Prior Publication Data

US 2024/0092105 A1 Mar. 21, 2024

Related U.S. Application Data

(63) Continuation of application No. PCT/JP2022/020177, filed on May 13, 2022.

(30) Foreign Application Priority Data

May 28, 2021 (JP) ................................ 2021-090203

(51) Int. Cl.

| | |
|---|---|
| ***B41J 33/12*** | (2006.01) |
| ***B41J 2/325*** | (2006.01) |
| ***B41J 29/13*** | (2006.01) |
| ***B41J 32/00*** | (2006.01) |
| ***B41J 33/00*** | (2006.01) |
| ***B41J 33/06*** | (2006.01) |

(52) U.S. Cl.
CPC ............... *B41J 33/12* (2013.01); *B41J 2/325* (2013.01); *B41J 29/13* (2013.01); *B41J 32/00* (2013.01); *B41J 33/003* (2013.01); *B41J 33/06* (2013.01)

(58) Field of Classification Search
CPC . B41J 33/12; B41J 32/00; B41J 33/003; B41J 33/06; B41J 35/28; B41J 2/325; B41J 29/13; B41J 17/32
See application file for complete search history.

(56) References Cited

U.S. PATENT DOCUMENTS

| | | | |
|---|---|---|---|
| 5,915,860 | A | 6/1999 | Laurent |
| 2010/0272488 | A1 | 10/2010 | Murata et al. |

(Continued)

FOREIGN PATENT DOCUMENTS

| | | | |
|---|---|---|---|
| CN | 102848751 | A | 1/2013 |
| CN | 104275951 | A | 1/2015 |

(Continued)

OTHER PUBLICATIONS

International Preliminary Report on Patentability for corresponding International Patent Application No. PCT/JP2022/020177 (Nov. 21, 2023).

(Continued)

*Primary Examiner* — Kristal Feggins
(74) *Attorney, Agent, or Firm* — Kenealy Vaidya LLP

(57) ABSTRACT

An ink ribbon cartridge includes a first spool, a first case covering the first spool, a second spool, a second case covering the second spool, a first rib provided at the first case, a second rib provided at the second case, an ink ribbon, a first protrusion, and a second protrusion. The first spool extends in a first direction and the second spool extends in a second direction. The first protrusion protrudes in the first direction from an end of the first case in the first direction. The second protrusion protrudes in the second direction from an end of the second case in the second direction. The first protrusion and the second protrusion are respectively (Continued)

fitted in a first hole and a second hole of a first frame of a printing device in a state where the ink ribbon cartridge is attached the printing device.

12 Claims, 10 Drawing Sheets

(56) References Cited

U.S. PATENT DOCUMENTS

| | | | |
|---|---|---|---|
| 2014/0140748 | A1 | 5/2014 | Sasaki |
| 2015/0002602 | A1 | 1/2015 | Hashimoto |
| 2018/0015759 | A1 | 1/2018 | Tonishi et al. |

FOREIGN PATENT DOCUMENTS

| | | | |
|---|---|---|---|
| CN | 205890264 | U | 1/2017 |
| JP | S60-236780 | A | 11/1985 |
| JP | 2001-260448 | A | 9/2001 |
| JP | 2001-260470 | A | 9/2001 |
| JP | 2009-202417 | A | 9/2009 |
| JP | 2010-253846 | A | 11/2010 |
| JP | 2013-010308 | A | 1/2013 |
| TW | 202035175 | A | 10/2020 |

OTHER PUBLICATIONS

International Search Report of the International Searching Authority for PCT/JP2022/020177 (Jul. 12, 2022).

INK RIBBON CARTRIDGE HAVING FIRST AND SECOND PROTRUSIONS TO BE FITTED IN FIRST AND SECOND HOLES OF FRAME OF PRINTING DEVICE, AND PRINTING DEVICE USING THE SAME

REFERENCE TO RELATED APPLICATIONS

This is a by-pass continuation application of International Application No. PCT/JP2022/020177 filed May 13, 2022 claiming priority from Japanese Patent Application No. 2021-090203 filed May 28, 2021. The entire contents of the International Application and the priority application are incorporated herein by reference.

BACKGROUND ART

Conventionally, there have been known a printing device configured to perform printing on a printing medium by heating an ink ribbon with a thermal head to transfer ink from the ink ribbon onto the printing medium, and an ink ribbon cartridge housing the ink ribbon to be used in the printing device. A prior art discloses a cartridge body housing a supply spool around which the ink ribbon is wound, and a take-up spool for taking up used ink ribbon that was paid off the supply spool and used. On an insertion surface of the cartridge body, drive holes for the supply spool and take-up spool are respectively open. Each drive hole engages with a drive shaft in the printing device when the cartridge body is attached to a cartridge attachment section in a device body of the printing device. On a positioning surface of the cartridge body, which is a side surface of the cartridge body opposite the insertion surface, positioning holes are formed. In a frame constituting the device body, positioning protrusions corresponding to the positioning holes of the cartridge body are formed. The positioning protrusions engage in the positioning holes from inside of the cartridge body when the cartridge body is inserted in the cartridge attachment section.

SUMMARY

In the above technology, the positioning protrusions need to be provided separately on the frame. Further, since positioning of the cartridge body is performed relative to the positioning protrusions that are provided separately on the frame, accuracy in the positioning of the cartridge body relative to the frame is difficult to be maintained.

In view of the foregoing, it is an object of the present disclosure to provide an ink ribbon cartridge and a printing device capable of improving the positioning accuracy of the ink ribbon cartridge within the printing device without increasing the number of parts of the printing device.

In order to attain the above and other object, according to a first aspect, the present disclosure provides an ink ribbon cartridge attachable to a printing device including a first frame. The ink ribbon cartridge includes: a first spool extending in a first direction; a first case covering the first spool, the first case having a first end and a first other end opposite the first end in the first direction; a second spool extending in a second direction; a second case covering the second spool, the second case having a second end and a second other end opposite the second end in the second direction; a first rib provided at the first case; a second rib provided at the second case; an ink ribbon having one end wound over the first spool and another end wound over the second spool, the ink ribbon being arranged to extend, from the one end to the another end, sequentially over the first spool, the first rib, the second rib, and the second spool; a first protrusion protruding in the first direction from the first end of the first case, the first protrusion being fitted in a first hole of the first frame inside the printing device in a state where the ink ribbon cartridge is attached to the printing device; and a second protrusion protruding in the second direction from the second end of the second case, the second protrusion being fitted in a second hole of the first frame in the state where the ink ribbon cartridge is attached to the printing device.

By engaging the first protrusion provided at the first case and the second protrusion provided at the second case respectively in the first and second holes provided in the first frame inside the printing device, the ink ribbon cartridge is positioned with respect to the first and second holes. Therefore, positioning accuracy of the ink ribbon cartridge inside the printing device can be improved without increasing the number of parts in the printing device.

According to a second aspect, the present disclosure also provides a printing device to which the ink ribbon cartridge according to the first aspect is attachable. The printing device is characterized by including: the first frame; a first support shaft supporting a platen roller; a second support shaft supporting a print head; a second frame positioned to oppose the first frame; and a connecting member connecting the first frame and the second frame to each other. The printing device is characterized in that: each of the first frame and the second frame has a third shaft hole and a fourth shaft hole, ends of the first support shaft being fitted in the third shaft holes and ends of the second support shaft being fitted in the fourth shaft holes; the first support shaft and the second support shaft are arranged in parallel to each other by fitting the first support shaft in the respective third shaft holes of the first frame and the second frame and by fitting the second support shaft in the respective fourth shaft holes of the first frame and the second frame; and a rigidity of the connecting member is lower than a rigidity of the first frame and the second frame.

The first support shaft and the second support shaft are arranged in parallel to each other by being fitted in the respective third holes and fourth holes of the first frame and second frame. In a state where the first frame and the second frame are arranged to face each other, the positions of the third hole and the fourth hole provided in the first frame and the positions of the third hole and the fourth hole provided in the second frame may be offset from those positions where the third hole and the fourth hole in the first frame and the third hole and the fourth hole in the second frame directly oppose each other. Even in such cases, since the rigidity of the connecting member is lower than the rigidity of the first and second frames, the connecting member can elastically deform to maintain the first and second support shafts in a parallel arrangement. Hence, the printing device can maintain the positional relationship between the platen roller and the print head precisely.

DESCRIPTION

Figure 1:
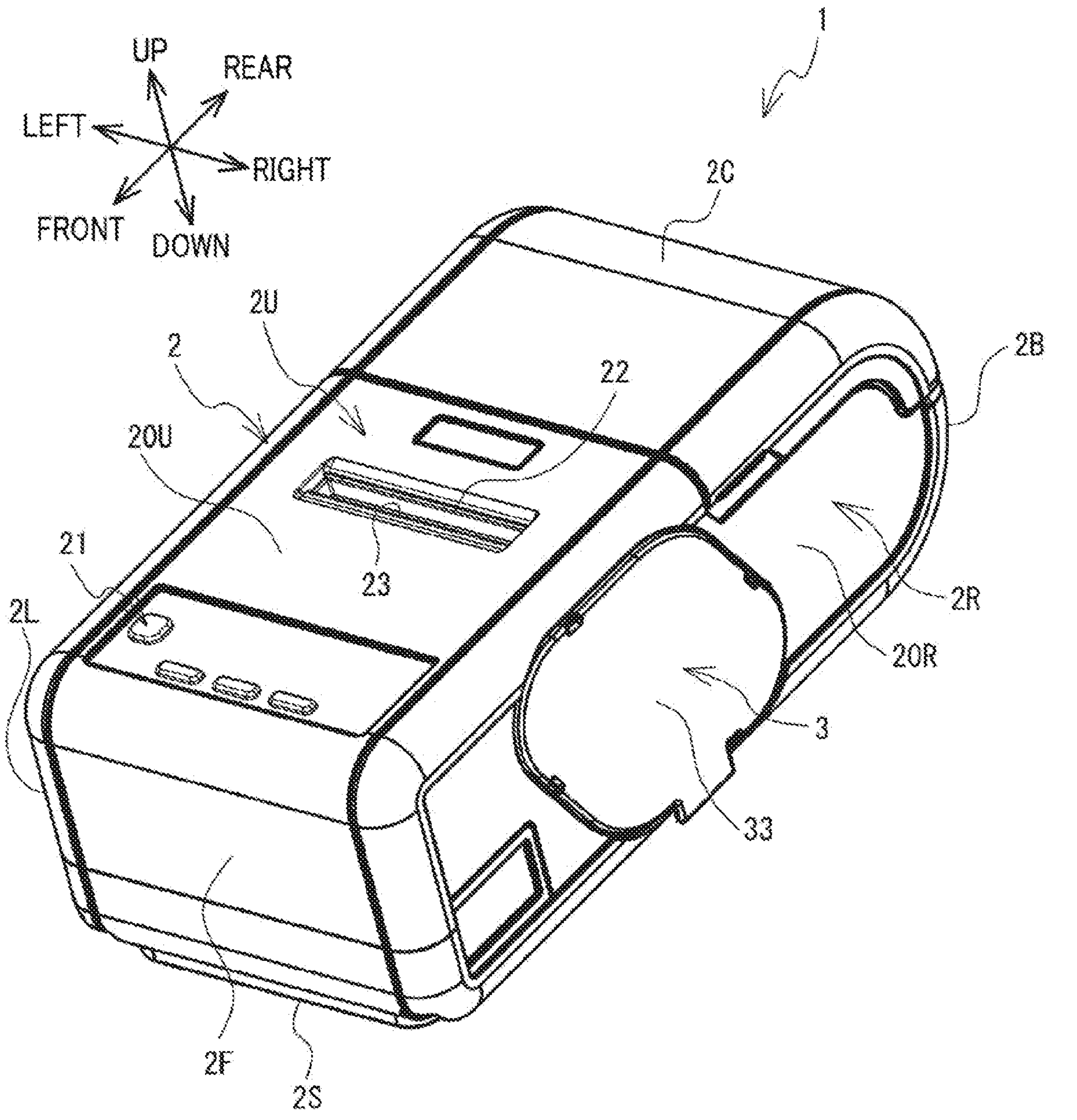
FIG. 1 is a perspective view of a printing device 1.

A printing device 1 and an ink ribbon cartridge 3 according to an embodiment of the present disclosure will be described with reference to drawings. The drawings to be referred to are used to describe technical features made possible with the present disclosure. Structures and the like of devices described herein are merely illustrative examples and are not intended to be limited thereto. In FIG. 1, the top, bottom, upper-left, lower-right, lower-left, and upper-right sides will be referred to as the top, bottom, left, right, front, and rear sides, respectively, of the printing device 1 and the ink ribbon cartridge 3.

An overview of the printing device 1 will be described with reference to FIGS. 1 through 3. The printing device 1 is a printing device of a thermal-transfer type. As illustrated in FIG. 1, the printing device 1 includes a housing 2. The housing 2 is made of synthetic resin, is box-shaped, and is of a size suitable to be placed on a tabletop. The housing 2 has an upper wall 2U, a bottom wall 2S, a left wall 2L, a right wall 2R, a front wall 2F, a rear wall 2B, and a cover 2C. A plurality of switches 21 is provided on an upper surface 20U of the upper wall 2U at a front end portion thereof. A discharge part 22 is provided in the upper surface 20U at a position rearward of the switches 21. The discharge part 22 is a through-hole formed in the upper wall 2U. The discharge part 22 has a rectangular shape that is elongated in a left-right direction.

Figure 2:
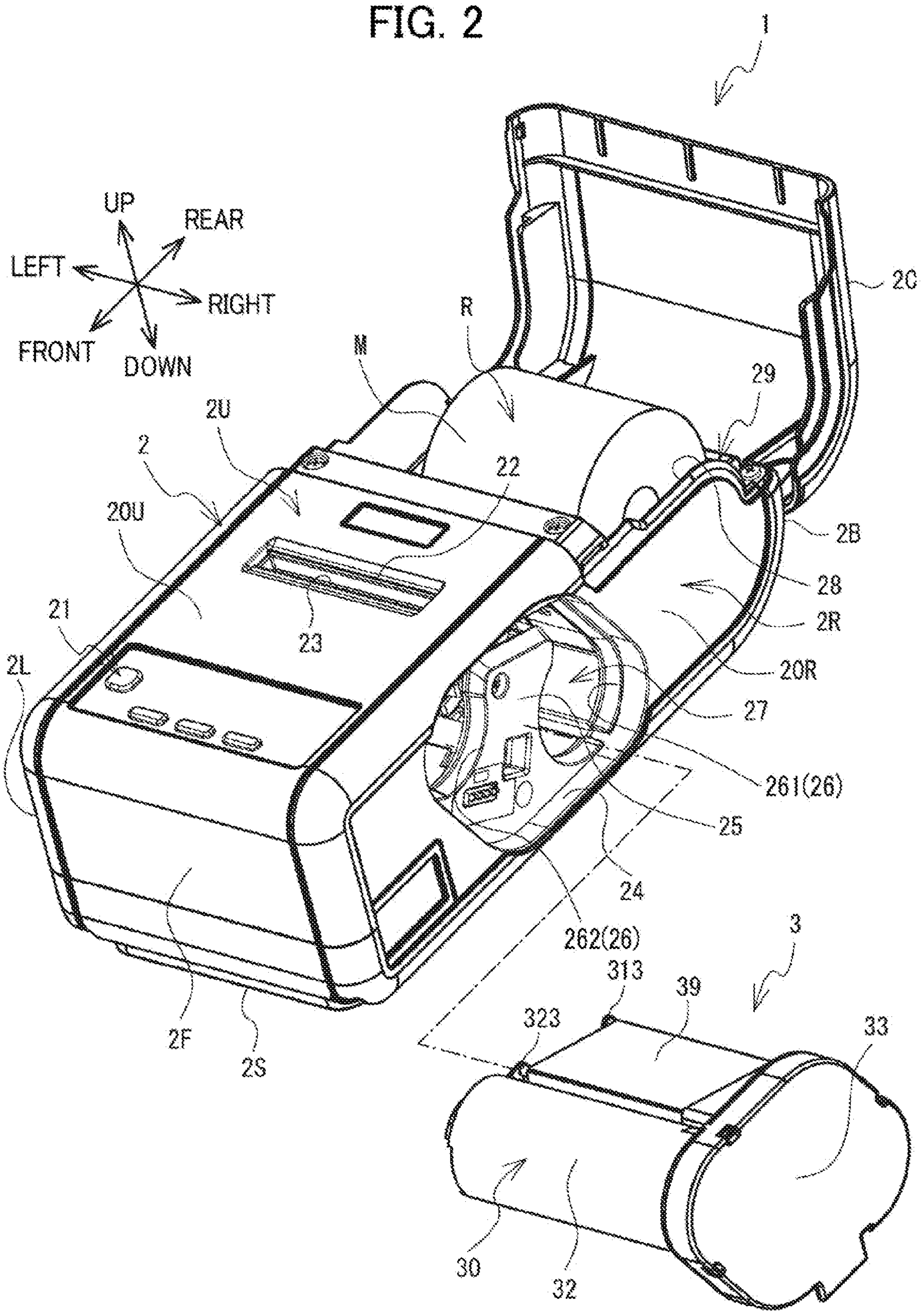
FIG. 2 is a perspective view of the printing device 1 in a state where an aperture 28 is exposed and an ink ribbon cartridge 3 is removed.

As illustrated in FIG. 2, an aperture 28 is formed in a rear end portion of the housing 2. The aperture 28 is defined by: a rear end of the upper wall 2U, an upper end of the rear wall 2B, a part of an upper end of the left wall 2L near a rear end thereof, and a part of an upper end of the right wall 2R near a rear end thereof. The cover 2C is pivotably supported at the upper end of the rear wall 2B such that the cover 2C can open and close the aperture 28. FIGS. 1 and 3 depict a state where the aperture 28 is closed by the cover 2C. FIG. 2 depicts a state where the cover 2C opens the aperture 28 after being pivoted from the state illustrated in FIGS. 1 and 3. The aperture 28 is in communication with a medium attachment portion 29, which is an internal region of the housing 2. A medium roll R configured by a printing medium M wound over a cylindrical core is detachable attachable to the medium attachment portion 29. A user can replace the medium roll R by making the aperture 28 open.

The ink ribbon cartridge 3 is made of a synthetic resin, and includes a case 30 and a case cover 33. The case 30 includes a first case 31 and a second case 32 which will be described later with reference to FIG. 6. Each of the first case 31 and second case 32 has a hollow cylindrical shape elongated in the left-right direction, and accommodates therein an ink ribbon 39. The case cover 33 has a generally parallelogram shape in a side view, and serves to cover a right end of the case 30. The ink ribbon 39 is paid out from the ink ribbon cartridge 3 and conveyed inside the housing 2.

An opening 24 is provided in a right surface 20R of the right wall 2R. The opening 24 extends leftward from the right surface 20R of the right wall 2R to have a squared cylindrical shape. In a right side view, the opening 24 has a shape that is generally identical to an outer shape of the case cover 33. The opening 24 has a depth in the left-right direction that is substantially the same as a thickness of the case cover 33 in the left-right direction. A side plate portion 25 is provided on the inside of the opening 24. The side plate portion 25 is a plate-shaped portion that is erected from a bottom portion of a left edge of the opening 24 and that extends in parallel to the right wall 2R. A cartridge insertion hole 26 is formed in the side plate portion 25 to penetrate the same. The cartridge insertion hole 26 is in communication with a cartridge attachment portion 27, which is an internal region of the housing 2. The ink ribbon cartridge 3 is detachably attachable to the cartridge attachment portion 27 through the cartridge insertion hole 26. FIG. 1 illustrates a state where the ink ribbon cartridge 3 is attached to the cartridge attachment portion 27. FIGS. 2 and 3 illustrate a state where the ink ribbon cartridge 3 is detached from the cartridge attachment portion 27.

The printing medium M is configured to be drawn off the medium roll R mounted in the medium attachment portion 29 in response to a drive force of a drive unit (not illustrated) provided inside the housing 2, and be conveyed frontward inside the housing 2 toward the discharge part 22. While being conveyed, the printing medium M moves above and in parallel to the ink ribbon 39 that is paid out from the ink ribbon cartridge 3. Hereinafter, respective portions of the printing medium M and the ink ribbon 39 that run in parallel to each other will be called "parallelly moving portions." In the parallelly moving portions, a print head 50 described later with respect to FIGS. 4 and 5 heats the ink ribbon 39 to transfer ink in the ink ribbon 39 to the printing medium M. Hereinafter, those operations executed by the printing device 1 to heat the ink ribbon 39 with the print head 50 to transfer the ink from the ink ribbon 39 to the printing medium M will be referred to "printing operation." After the ink is transferred from the printing medium M, the printing medium M is discharged to the outside of the housing 2 through the discharge part 22. A cutting part 23 provided at a front end of the discharge part 22 is a blade that can cut a printed portion of the printing medium M to separate the same from a remaining portion of the printing medium M.

Figure 3:
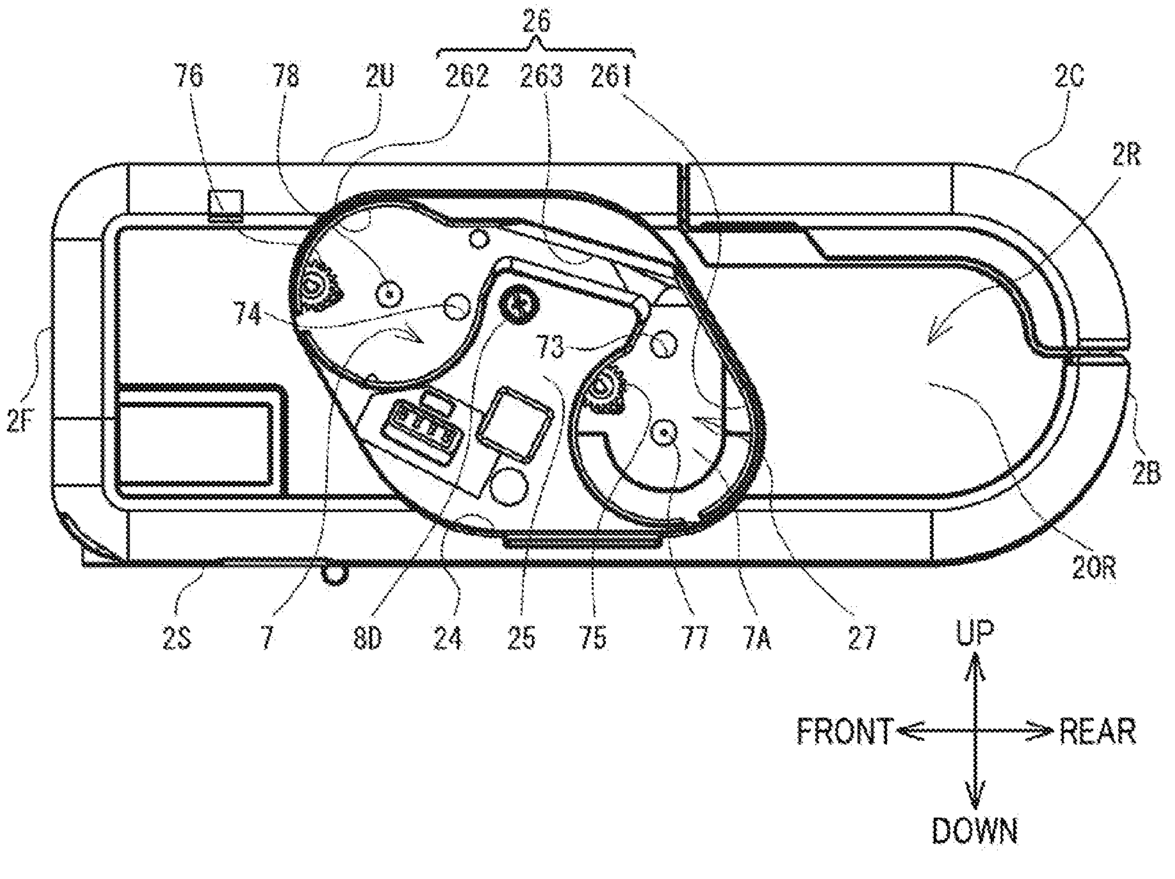
FIG. 3 is a right side view of the printing device 1 in a state where the ink ribbon cartridge 3 is removed.

As illustrated in FIG. 3, the cartridge insertion hole 26 has a first opening 261, a second opening 262, and an opening connecting part 263. The first opening 261 is an opening of a generally circular shape in a side view, and forms a lower-rear portion of the cartridge insertion hole 26. The second opening 262 is an opening of a generally circular shape in a side view, and forms an upper-front portion of the cartridge insertion hole 26. The opening connecting part 263 is an opening of a generally rectangular shape that extends diagonally upward from an upper end of the first opening 261 to an upper-rear end of the second opening 262. A circular-shaped portion of the first opening 261 has an inner diameter that is substantially identical to an outer diameter of the first case 31 of the ink ribbon cartridge 3. A circular-shaped portion of the second opening 262 has an inner diameter that is substantially identical to an outer diameter of the second case 32 of the ink ribbon cartridge 3.

Figure 4:
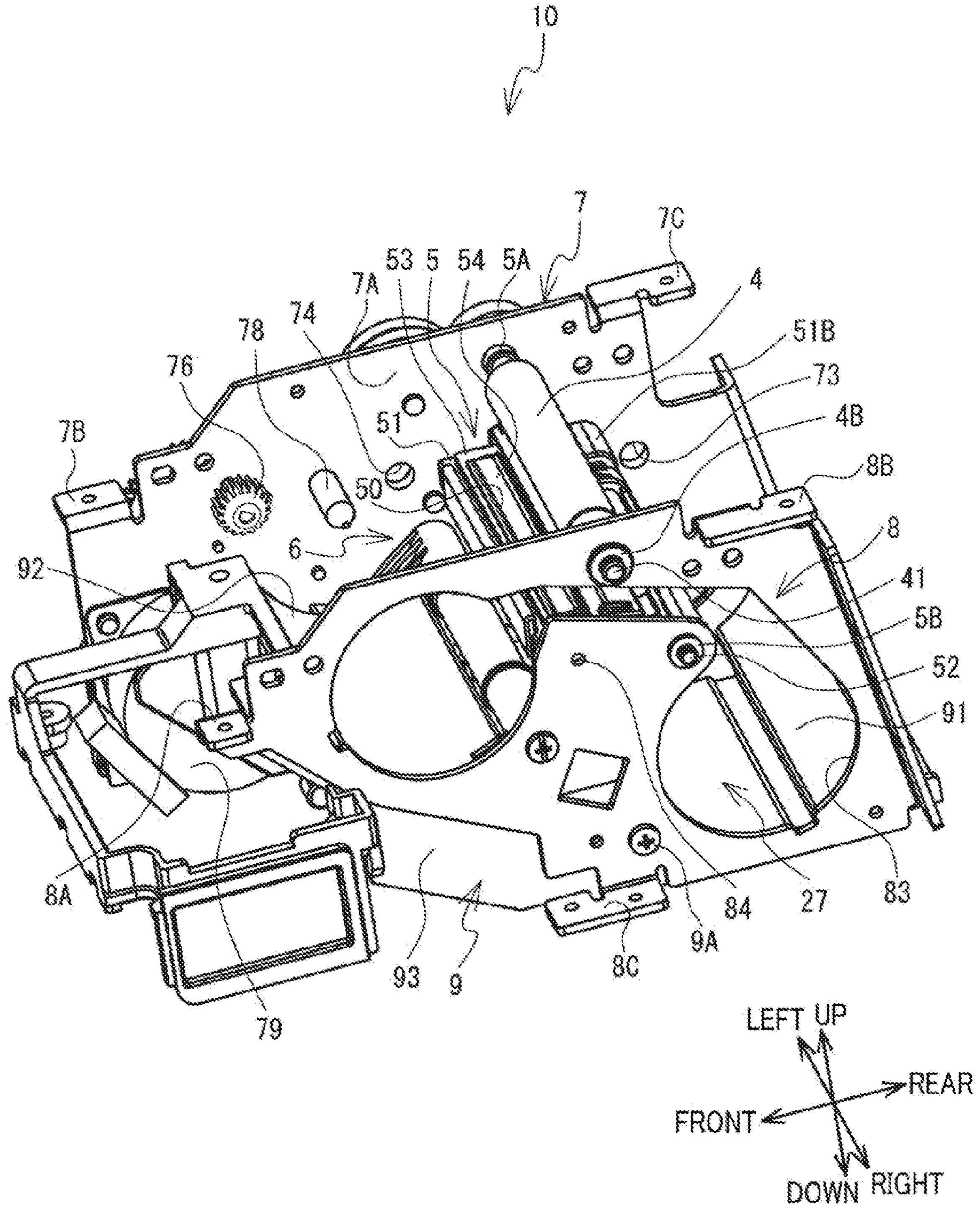
FIG. 4 is a perspective view of a printing mechanism 10.

A printing mechanism 10 will be described with reference to FIGS. 4 and 5. The printing mechanism 10 is arranged frontward of the medium attachment portion 29 inside the housing 2. The printing mechanism 10 includes a first frame 7, a second frame 8, a connecting member 9, a platen roller 4, a printing unit 5, and a lever member 6.

The first frame 7 and the second frame 8 are, respectively, plate-shaped members each having a generally rectangular shape in a side view. The first frame 7 and the second frame 8 are arranged to oppose each other in the left-right direction inside the housing 2. The first frame 7 and the second frame 8 are provided for fixing the platen roller 4, the printing unit 5, the lever member 6, and the ink ribbon cartridge 3 mounted in the cartridge attachment portion inside the housing 2.

The first frame 7 is provided on the right side of the left wall 2L inside the housing 2. The first frame 7 has an opposing surface 7A, and fixing portions 7B and 7C. The opposing surface 7A is a surface that opposes the second frame 8. The fixing portions 7B and 7C protrude leftward from front and rear ends on an upper edge of the opposing surface 7A, respectively. A screw hole for engagement by a screw is formed in each of the fixing portions 7B and 7C, and the first frame 7 is fixed to the housing 2 by screwing these screw holes to the housing 2 with screws. As such, the first frame 7 and the side plate portion 25 of the right wall 2R are arranged to oppose each other in the left-right direction. Therefore, as illustrated in FIG. 3, the opposing surface 7A of the first frame 7 is exposed through the cartridge insertion hole 26 of the side plate portion 25 when the housing 2 is viewed from its right side in a state where the ink ribbon cartridge 3 is removed from the cartridge attachment portion 27.

The opposing surface 7A has a first shaft hole 71, a second shaft hole 72, a first hole 73, a second hole 74, a first gear 75, a second gear 76, a first shaft 77, a second shaft 78, and a motor 79. The first shaft hole 71, the second shaft hole 72, the first hole 73, and the second hole 74 are, respectively, circular-shaped through-holes that penetrate the opposing surface 7A in the left-right direction. The first shaft hole 71 is provided in an upper end portion of the opposing surface 7A at a position frontward of the fixing portion 7C. The second shaft hole 72 is provided in the opposing surface 7A at a position below and rearward of the first shaft hole 71. The first hole 73 is provided at a position below and rearward of the second shaft hole 72. The second hole 74 is provided in a center portion of the opposing surface 7A with respect to a front-rear direction at a position generally the same as the position of the second shaft hole 72 in an up-down direction. The first gear 75 and the second gear 76 are small gears. The first gear 75 is disposed at a position below and frontward of the first hole 73. The second gear 76 is disposed frontward of the second hole 74. The first shaft 77 and the second shaft 78 are short shafts that protrude rightward from the opposing surface 7A. The first shaft 77 is arranged at a position below the first hole 73 and below and rearward of the first gear 75. The second shaft 78 is arranged at a position frontward of the second hole 74 and rearward of the second gear 76. The motor 79 is provided at a lower-front portion of the opposing surface 7A. The motor 79 transmits a drive force to a plurality of gears (not illustrated) provided on a surface of the first frame 7 opposite the opposing surface 7A. The first gear 75 and the second gear 76 are rotatable in response to the drive force transmitted to the plurality of gears.

The second frame 8 is arranged on the left side of the right wall 2R inside the housing 2. The second frame 8 has fixing portions 8A, 8B, and 8C, a first shaft hole 81, a second shaft hole 82, an opening 83, and a fixing hole 84. The fixing portions 8A and 8B are portions protruding rightward respectively from front and rear ends on an upper end of the second frame 8. The fixing portion 8C protrudes rightward from a bottom end of the second frame 8. A screw hole for engagement by a screw is formed in each of the fixing portions 8A, 8B, and 8C. The second frame 8 is fixed to the housing 2 by screwing the screw holes to the housing 2 with screws.

The first shaft hole 81 and the second shaft hole 82 are respectively circular-shaped through-holes that penetrate the second frame 8 in the left-right direction. The first shaft hole 81 is formed in an upper portion of the second frame 8 at a position frontward of the fixing portion 8B. The second shaft hole 82 is formed at a position below and rearward of the first shaft hole 81 in the second frame 8. The first shaft hole 81 and the second shaft hole 82 are arranged to directly oppose the first shaft hole 71 and the second shaft hole 72 of the first frame 7, respectively, in a state where the first frame 7 and the second frame 8 are arranged to face each other in the left-right direction. The opening 83 is an aperture that penetrates the second frame 8 in the left-right direction. The opening 83 has a shape that is substantially the same as the shape of the cartridge insertion hole 26 formed in the side plate portion 25 of the right wall 2R. The opening 83 has a size that is slightly larger than a size of the cartridge insertion hole 26. The fixing hole 84 is a circular-shaped hole that penetrates the second frame 8 in the left-right direction. An upper-front portion of the side plate portion 25 and the fixing hole 84 are fixed to each other by a screw 8D illustrated in FIG. 3. The second frame 8 is fixed inside the housing 2 such that the opening 83 is arranged on the left side of the cartridge insertion hole 26 formed in the side plate portion 25. Accordingly, as illustrated in FIG. 3, the second frame 8 is hidden by the side plate portion 25 and thus is not visible when the housing 2 is viewed from its right side in a state where the ink ribbon cartridge 3 is removed from the cartridge attachment portion 27.

Preferably, the first frame 7 and the second frame 8 be made of metal in order to realize precise positioning of: the first shaft hole 71, the second shaft hole 72, the first hole 73, and the second hole 74 of the first frame 7; and the first shaft hole 81, the second shaft hole 82, the opening 83, and the fixing hole 84 of the second frame 8. In the present embodiment, the first frame 7 and the second frame 8 are galvanized steel sheets.

The platen roller 4 nips the respective parallelly moving portions of the printing medium M and the ink ribbon 39 in conjunction with the print head 50 described later. The platen roller 4 is column-shaped. The platen roller 4 is disposed upward relative to the parallelly moving portion of the printing medium M. The platen roller 4 is formed with a through-hole 40 extending in the left-right direction. A first support shaft 41 is inserted in the through-hole 40 to extend therethrough. The first support shaft 41 is made of metal having high rigidity. In the present embodiment, the first support shaft 41 is made of free-cutting steel. The first support shaft 41 extends in the left-right direction. The first support shaft 41 has a left end that penetrates through the first shaft hole 71 of the first frame 7 and that is fixed to the first frame 7 with a fixing member 4A. The first support shaft 41 has a right end that penetrates through the first shaft hole 81 of the second frame 8 and that is fixed to the second frame 8 with a fixing member 4B. The platen roller 4 is rotatably supported by the first support shaft 41. The platen roller 4 has a rotation axis that is coincident with a center 4C of the first support shaft 41 illustrated in FIG. 5. The center 4C extends in a direction parallel to the left-right direction.

The printing unit 5 heats the parallelly moving portion of the ink ribbon 39 with the print head 50 described later, thereby transferring ink onto the printing medium M. The printing unit 5 is disposed downward relative to the parallelly moving portion of the ink ribbon 39. As illustrated in FIG. 5, the printing unit 5 includes a support part 51, a spring-receiving part 56, and a pair of springs 57.

The support part 51 includes a base 51A, and a pair of protruding portions 51B. The base 51A is plate-shaped, and crosses the up-down direction. The protruding portions 51B protrude rearward from a rear end of the base 51A. The protruding portions 51B have through-holes extending in the left-right direction. A second support shaft 52 is inserted in the respective through-holes of the protruding portions 51B to extend therethrough. The second support shaft 52 extends in the left-right direction. The second support shaft 52 has a left end that penetrates through the second shaft hole 72 of the first frame 7 and that is fixed to the first frame 7 with a fixing member 5A. The second support shaft 52 has a right end that penetrates through the second shaft hole 82 of the second frame 8 and that is fixed to the second frame 8 with a fixing member 5B. The support part 51 is pivotably supported by the second support shaft 52. The support part 51 has a pivot center that is coincident with a center 5C of the second support shaft 52. The center 5C is positioned below and rearward of the center 4C of the first support shaft 41 that supports the platen roller 4. The center 5C extends in parallel to the center 4C of the first support shaft 41.

A seat 53 is fixed to an upper surface of the base 51A. A substrate 54 is fixed to an upper surface of the seat 53. The print head 50 is provided on an upper surface of the substrate 54. The print head 50 is a line thermal head configured of a plurality of heating elements. The print head 50 extends in parallel to the center 5C of the second support shaft 52.

Figure 5:
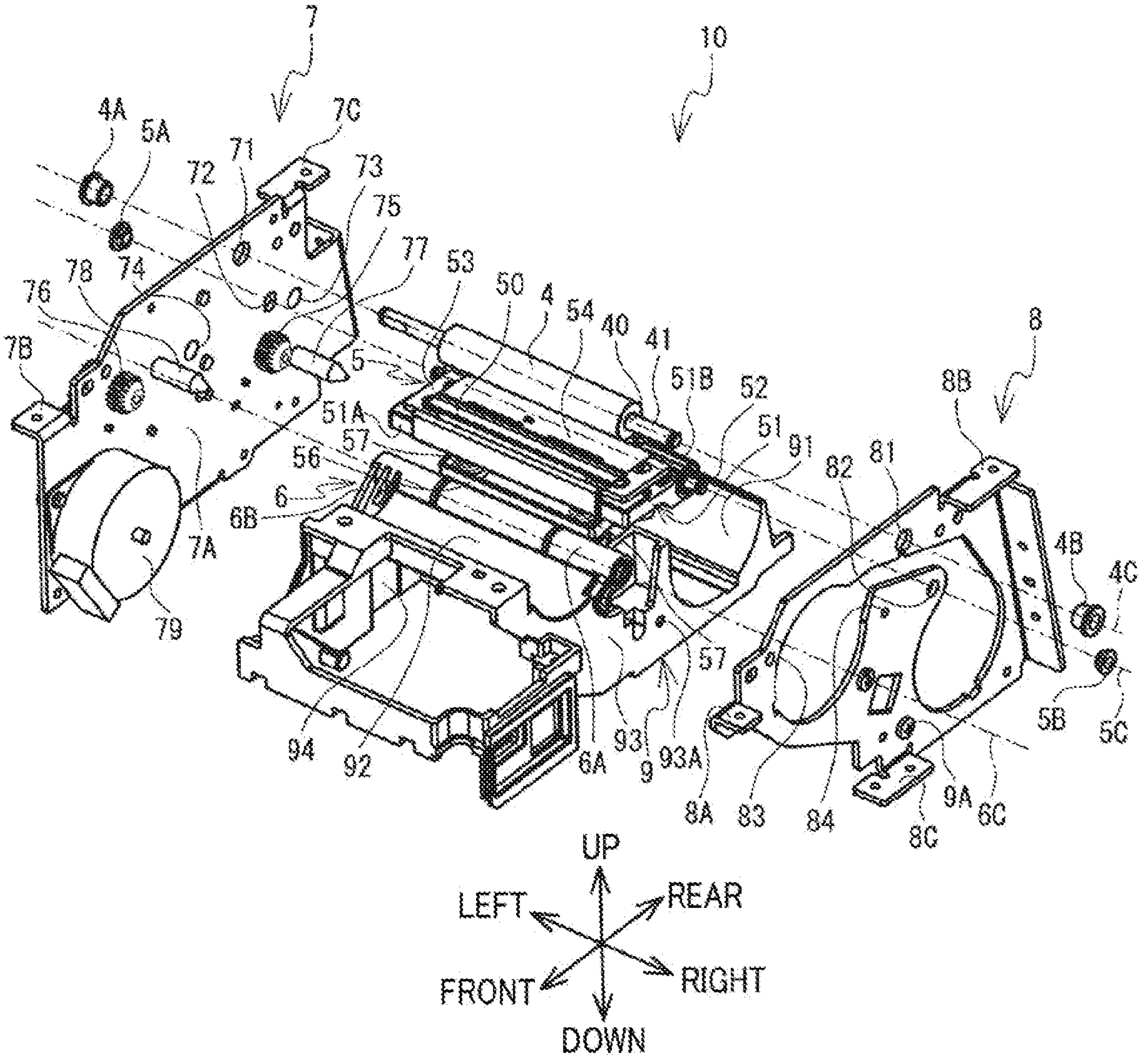
FIG. 5 is an exploded perspective view of the printing mechanism 10.

As illustrated in FIG. 5, the spring-receiving part 56 is disposed below the base 51A of the support part 51. The spring-receiving part 56 receives the pair of springs 57 on an upper surface of the spring-receiving part 56. The pair of springs 57 is arranged above the spring-receiving part 56 and near left and right ends of the same. Each of the pair of springs 57 is a compression coil spring. The pair of springs 57 is interposed between the base 51A of the support part 51 and the spring-receiving part 56.

The lever member 6 includes a pressing part 6A, and an operating part 6B. The pressing part 6A is column-shaped and extends in the left-right direction. The pressing part 6A has a through-hole extending in the left-right direction. A lever pivot shaft (not illustrated) is inserted in the through-hole to extend therethrough. The lever pivot shaft extends in the left-right direction. The lever pivot shaft has left and right ends that are fixed to the first frame 7 and the second frame 8, respectively. The lever member 6 is pivotably supported by the lever pivot shaft. The lever member 6 has a pivot center that is coincident with a center 6C of the lever pivot shaft. The operating part 6B extends downward and frontward from a left end portion of the pressing part 6A. In response to a user's operation on the operating part 6B, the pressing part 6A presses the spring-receiving part 56 from below, compressing the pair of springs 57. Due to an elastic force generated by this compression, the springs 57 press the support part 51 so that the print head 50 of the printing unit 5 is pressed toward the platen roller 4.

The connecting member 9 is a member connecting the bottom portion of the first frame 7 and the bottom portion of the second frame 8 to each other in the left-right direction. The connecting member 9 is plate-shaped, and includes a first curved portion 91, a second curved portion 92, a right side plate 93, and a left side plate 94. The first curved portion 91 extends in the left-right direction. In a side view, the first curved portion 91 has a semi-cylindrical shape that is recessed downward. The first curved portion 91 constitutes a rear portion of the connecting member 9. The second curved portion 92 is provided frontward and upward of the first curved portion 91. Similar to the first curved portion 91, the second curved portion 92 extends in the left-right direction, and, in a side view, has a semi-cylindrical shape that is recessed downward. The first curved portion 91 has a shape that is slightly larger than a shape of a lower portion of the first case 31 in the case 30 of the ink ribbon cartridge 3. The second curved portion 92 has a shape that is slightly larger than a shape of a lower portion of the second case 32 in the case 30 of the ink ribbon cartridge 3. The right side plate 93 extends slightly downward from respective right ends of the first curved portion 91 and the second curved portion 92, and constitutes a right side portion of the connecting member 9. The left side plate 94 extends slightly downward from respective left ends of the first curved portion 91 and the second curved portion 92, and constitutes a left side portion of the connecting member 9. In an approximate center of the right side plate 93, a screw hole 93A is formed for engagement with a screw 9A. By screw-fixing of the screw hole 93A to the second frame 8, the second frame 8 and the connecting member 9 are connected to each other. The first frame 7 and the connecting member 9 are connected to each other in a similar manner through the left side plate 94 and the first frame 7. Incidentally, the cartridge attachment portion 27 is a region that is defined by the first frame 7, the second frame 8, and the connecting member 9.

The connecting member 9 has a rigidity of the first frame 7 and the second frame 8, which are made of stainless steel. In the present embodiment, the connecting member 9 is made of synthetic resin. With the first support shaft 41 fixed to the first frame 7 and the second frame 8 at the first shaft holes 71 and 81 and the second support shaft 52 fixed to the first frame 7 and the second frame 8 at the second shaft holes 72 and 82, the center 4C and the center 5C extend in parallel to each other. With this arrangement, the parallelly moving portion of the printing medium M is conveyed by the platen roller 4 in a direction orthogonal to an extending direction of the print head 50, thereby maintaining printing accuracy with respect to the printing medium M. Suppose that the first shaft hole 81 and the second shaft hole 82 of the second frame 8 are arranged offset from the first shaft hole 71 and the second shaft hole 72 of the first frame 7, respectively, rather than directly opposite the first shaft hole 71 and the second shaft hole 72 of the first frame 7. Even in this case, the center 4C of the first support shaft 41 and the center 5C of the second support shaft 52 are maintained in parallel to each other, since the connecting member 9 can undergo elastic deformation due to its lower rigidity than the first frame 7 and the second frame 8.

A structure of the ink ribbon cartridge 3 will be described with reference to FIGS. 6 through 8. Incidentally, the ink ribbon 39 is not depicted in FIGS. 7 and 8.

Figure 6:
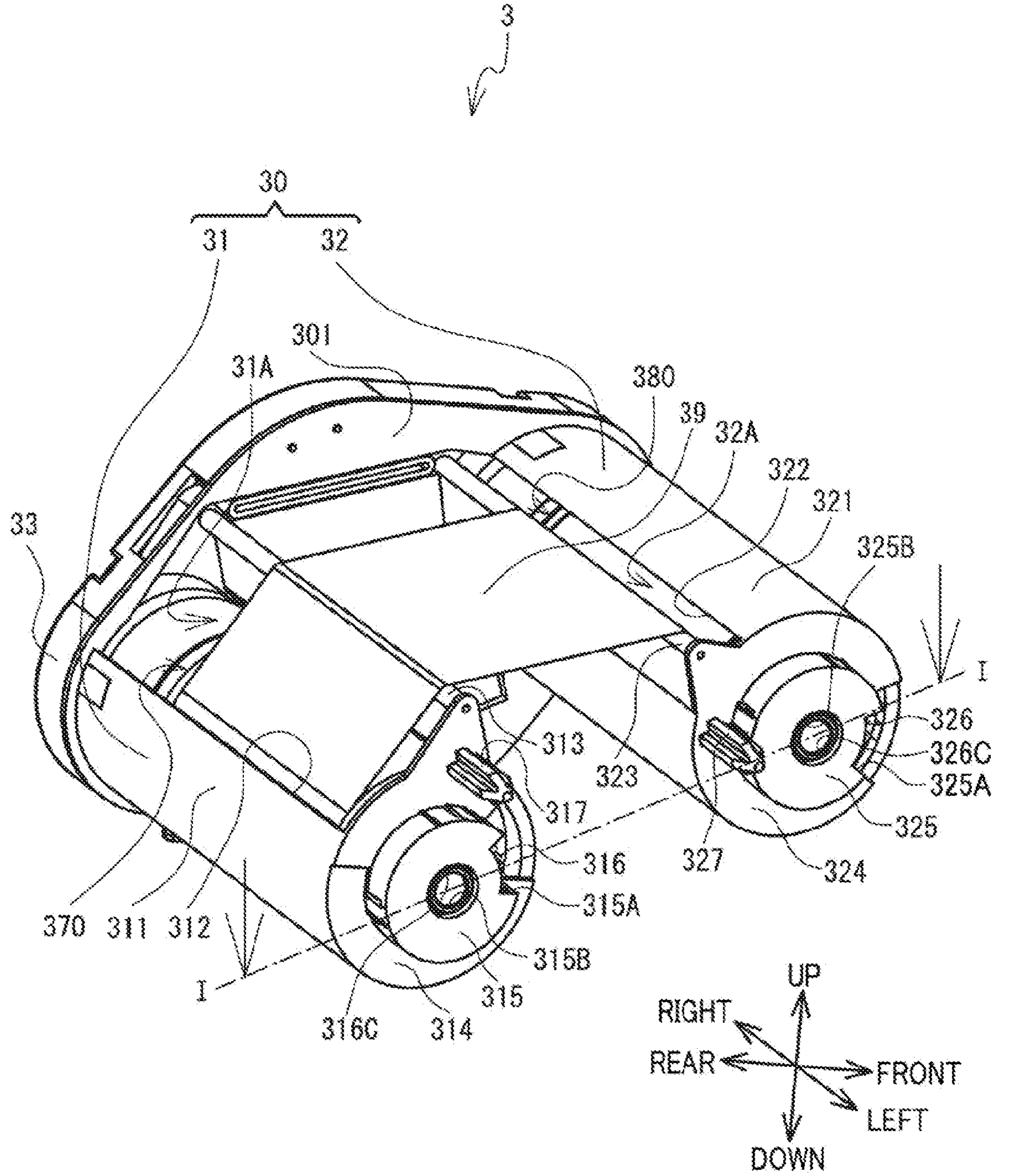
FIG. 6 is a perspective view of the ink ribbon cartridge 3.

As illustrated in FIG. 6, the case 30 includes the first case 31 and the second case 32. The first case 31 has a cylindrical shape that extends in the left-right direction and constitutes a rear portion of the case 30. The first case 31 covers a first spool 370 described later with reference to FIGS. 7 and 8, and houses the ink ribbon 39 before the ink ribbon 39 is used in a printing operation. The first case 31 includes a first main body 311, a first end 314, a first opening 312, a first rib 313, a first gear 316, a first gear cover 315, and a first protrusion

317. The first main body 311 constitutes a side surface portion of the cylindrical-shaped first case 31. The first main body 311 has an upper-rear section that is cut out in the left-right direction. The first end 314 is a portion corresponding to a bottom surface on a left side of the first case 31, and constitutes a left end of the first case 31. The first rib 313 is a plate-shaped portion that protrudes diagonally upward and rearward from an upper-front end of the first main body 311 and that extends in the left-right direction. The first opening 312 is an opening formed in an upper-rear portion of the first case 31, the first opening 312 being surrounded by an upper edge constituting the cutout in the first main body 311, an upper-rear portion of the first end 314, and an upper edge of the first rib 313. The first opening 312 is in communication with a first housing section 31A. The first housing section 31A is an interior region of the first case 31 that is defined as a substantially cylindrical shape by inner walls of the first main body 311. The ink ribbon 39 accommodated in the first housing section 31A is paid out through the first opening 312 and arranged to extend over the first rib 313. The upper edge of the first rib 313 on which the ink ribbon 39 abuts is rounded.

The first gear 316 is a gear provided at a center portion of the first end 314. The first gear cover 315 is a cover member that covers the first gear 316 from a left side thereof. A notch 315A is formed in an upper-front portion of the first gear cover 315. A portion of gear teeth of the first gear 316 is exposed through the notch 315A. A through-hole 315B is formed in a center portion of the first gear cover 315 to penetrate through a left surface of the first gear cover 315. The first protrusion 317 is a shaft-like protrusion that protrudes leftward from an upper portion of the first end 314.

A hole 318 is formed in the center portion of the first end 314. The hole 318 is a circular hole that penetrates through the first end 314. The first gear 316 includes a shaft portion 316A that extends rightward from a right surface of the gear teeth. The hole 318 has a diameter that is larger than an outer diameter of the shaft portion 316A. A torsion spring 316B is fitted over a right end of the shaft portion 316A.

The first spool 370 is housed in the first housing section 31A. The first spool 370 includes a shaft portion 360, a gear connecting portion 340, and a flange portion 350. The shaft portion 360 is a shaft-like portion that extends in a direction along an extending direction of the first main body 311 constituting the first case 31. The shaft portion 360 is formed with a through-hole 361 extending along an axial center 37C of the shaft portion 360. Hereinafter, the direction in which the axial center 37C extends in a state where the first spool 370 is accommodated in the first housing section 31A will be called a first direction. In the present embodiment, the first direction is coincident with the left-right direction. One end of the ink ribbon 39 prior to being used in a printing operation is fixed to the shaft portion 360, and the ink ribbon 39 continuous with the fixed one end is wound around the shaft portion 360. Incidentally, the first end 314 is an end of the first main body 311 covering the first spool 370 at one side in the first direction. The first protrusion 317 protrudes in the first direction from the first end 314.

The gear connecting portion 340 constitutes an end of the first spool 370 that is positioned to face the first end 314 of the first case 31 when the first spool 370 is accommodated in the first housing section 31A. The gear connecting portion 340 is a member fitted around the shaft portion 316A of the first gear 316 and the torsion spring 316B for transmitting the rotation of the first gear 316 to the shaft portion 360. The gear connecting portion 340 includes an insertion shaft portion 341, a circular flange 342, and a first spool rib 343. The insertion shaft portion 341 is a shaft-like portion that extends in the first direction. The circular flange 342 constitutes a left end of the gear connecting portion 340. The circular flange 342 is a plate-like portion that is circular in a side view, and extends radially outward from the insertion shaft portion 341 at a left end thereof. The circular flange 342 has an outer diameter that is approximately the same as an outer diameter of the shaft portion 360. The insertion shaft portion 341 has an outer diameter that is approximately the same as an inner diameter of the through-hole 361 formed in the shaft portion 360. The insertion shaft portion 341 has a left end provided with a step portion 344. The step portion 344 protrudes outwardly from an outer surface of the insertion shaft portion 341 to have a prescribed width. The shaft portion 360 has a left end portion a portion of which is cut out to form a notch 362. The notch 362 has a width that is approximately the same as the width of the step portion 344 and is notched rightward from the left end portion of the shaft portion 360. The insertion shaft portion 341 is inserted into the through-hole 361 from the left end of the shaft portion 360. By the step portion 344 being fitted in the notch 362, the gear connecting portion 340 is fixed to the shaft portion 360 so as not to rotate relative thereto. The first spool rib 343 is a cylindrical-shaped rib centered on the axial center 37C and protrudes in the first direction from the circular flange 342. The first spool rib 343 has an outer diameter that is approximately the same as the outer diameter of the insertion shaft portion 341.

The first spool rib 343 has an inner periphery that is continuous with an inner periphery of the insertion shaft portion 341, forming a recess 346 that is recessed rightward from the left end of the first spool rib 343. The recess 346 has a size suitable for accommodating the shaft portion 316A of the first gear 316 around which the torsion spring 316B is fitted. The recess 346 has a right end provided with an engaging part 349 illustrated in FIG. 9 to engage a right arm portion of the torsion spring 316B. An engaging part (not illustrated) is provided on the shaft portion 316A of the first gear 316 to engage a left arm portion of the torsion spring 316B. The first gear 316 has a center portion formed with a recess 316C that is recessed rightward.

In the first case 31, one end thereof opposite the first end 314 in the first direction and connected to a plate-shaped part 301 will be called a first other end of the first case 31. The flange portion 350 constitutes an end of the first spool 370 positioned to face the first other end of the first case 31 when the first spool 370 is accommodated in the first housing section 31A. The flange portion 350 includes an insertion shaft portion 351, a first flange portion 352, and a cylindrical portion 353. The insertion shaft portion 351 is a shaft-like portion that extends in the first direction. The insertion shaft portion 351 has an outer diameter that is approximately the same as the inner diameter of the through-hole 361 formed in the shaft portion 360. The insertion shaft portion 351 is inserted in the through-hole 361 from the right end of the shaft portion 360. The first flange portion 352 is a plate-like portion that is circular in a side view. The first flange portion 352 extends radially outward from the insertion shaft portion 351 at a right end of the same. The first flange portion 352 has an outer diameter that corresponds to the inner diameter of the first main body 311, i.e., the diameter of the cylindrical-shaped first housing section 31A. In the present embodiment, the outer diameter of the first flange portion 352 is slightly smaller than the inner diameter of the first main body 311, and the difference between the outer diameter of the first flange portion 352 and the inner diameter of the first main body 311 is about 0.1 millimeters. With this structure, the first spool 370 is positioned relative to the first case 31 so that the axial center 37C of the first spool 370 housed in the first housing section 31A is aligned with the center of the first main body 311. In the first housing section 31A, the first spool 370 is disposed such that the first spool 370 is rotatable about the axial center 37C. The cylindrical portion 353 is a cylindrical member that protrudes rightward from the right surface of the first flange portion 352.

The second case 32 has approximately the same shape as the first case 31 and constitutes a front portion of the case 30. The second case 32 covers a second spool 380 described later with reference to FIGS. 7 and 8, and houses the ink ribbon 39 after the ink ribbon 39 is used in a printing operation. The second case 32 includes a second main body 321, a second end 324, a second opening 322, a second rib 323, a second gear 326, a second gear cover 325, and a second protrusion 327. The second main body 321 constitutes a side surface portion of the cylindrical-shaped second case 32. The second main body 321 has an upper-rear portion that is cut out in the left-right direction. The second end 324 corresponds to a bottom surface on the left side of the second case 32, and constitutes a left end of the second case 32. The second rib 323 is a plate-like portion that protrudes upward from an upper-rear portion of the second main body 321 and that extends in the left-right direction. The second opening 322 is an opening formed in an upper-rear portion of the second case 32, the second opening 322 being surrounded by an upper edge constituting the cutout in the second main body 321, an upper-rear portion of the second end 324, and an upper edge of the second rib 323. The second opening 322 is in communication with a second housing section 32A. The second housing section 32A is an interior region of the second case 32 that is defined as a substantially cylindrical shape by inner walls of the second main body 321. After being used in a printing operation, the ink ribbon 39 contacts the second rib 323 and is then accommodated inside the second housing section 32A through the second opening 322. The upper edge of the second rib 323, on which the ink ribbon 39 abuts, is rounded.

The second gear 326 is a gear provided at a center portion of the second end 324. The second gear cover 325 is a cover member that covers the second gear 326 from a left side thereof. The second gear cover 325 has a front portion formed with a notch 325A. A portion of gear teeth of the second gear 326 is exposed through the notch 325A. A through-hole 325B is formed in a center portion of the second gear cover 325. The through-hole 325B penetrates through a left surface of the second gear cover 325. The second protrusion 327 is a shaft-like protrusion that protrudes leftward from a rear portion of the second end 324.

A hole 328 is formed in the center portion of the second end 324. The hole 328 is a circular hole that penetrates the second end 324. The second gear 326 includes a shaft portion 326A that extends rightward from a right surface of the gear teeth. The hole 328 has a diameter that is larger than an outer diameter of the shaft portion 326A. A torsion spring 326B is fitted over a right end of the shaft portion 326A.

The second spool 380 is housed in the second housing section 32A. The second spool 380 includes a shaft portion 381, a second flange portion 382, and a gear connecting portion 383. The shaft portion 381 is a shaft-like portion that extends in a direction along an extending direction of the second main body 321 constituting the second case 32. Hereinafter, the direction in which an axial center 38C of the shaft portion 381 extends in a state where the second spool 380 is accommodated in the second housing section 32A will be called a second direction. In the present embodiment, the second direction is coincident with the left-right direction and is parallel to the first direction. One end of the ink ribbon 39 that has been used in a printing operation is fixed to the shaft portion 381, and the ink ribbon 39 continuous with the fixed one end is wound around the shaft portion 381. Incidentally, the second end 324 is an end of the second main body 321 covering the second spool 380 at one side in the second direction. The second protrusion 327 protrudes from the second end 324 in the second direction.

Figure 9:
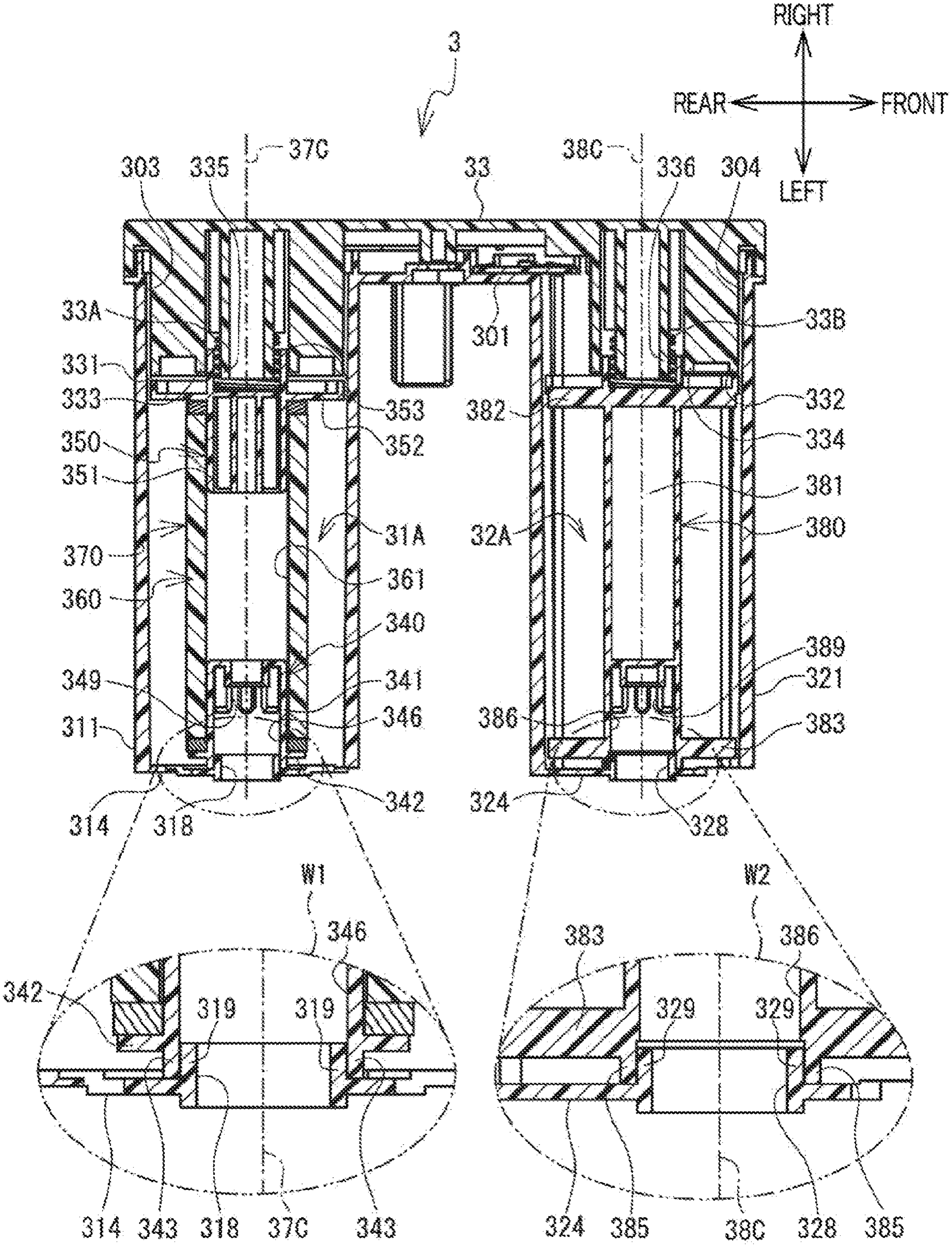
FIG. 9 is a cross-sectional view taken along a line I-I in FIG. 6 as viewed in a direction of arrows illustrated in FIG. 6.

The gear connecting portion 383 constitutes an end of the second spool 380 positioned to face the second end 324 of the second case 32 when the second spool 380 is accommodated in the second housing section 32A. The gear connecting portion 383 is a plate-like portion that is circular in a side view, and extends radially outward from the shaft portion 381 at a left end of the same. The gear connecting portion 383 has an outer diameter that is approximately the same as an outer diameter of the second flange portion 382 described later and that corresponds to an inner diameter of the second main body 321. A second spool rib 385 is a cylindrical-shaped rib centered on the axial center 38C and protrudes leftward in the second direction from the gear connecting portion 383. The second spool rib 385 has an inner periphery that is continuous with an inner periphery of the shaft portion 381, forming a recess 386 that is recessed rightward from a left end of the second spool rib 385. The recess 386 has a size suitable for accommodating the shaft portion 326A of the second gear 326 around which the torsion spring 326B is fitted. An engaging part 389 illustrated in FIG. 9 is provided at the right end of the recess 386 to engage a right arm portion of the torsion spring 326B. An engaging part (not illustrated) is provided at the shaft portion 326A of the second gear 326 to engage a left arm portion of the torsion spring 326B. The second gear 326 has a center portion formed with a recess 326C that is recessed rightward therefrom.

In the second case 32, an end thereof opposite the second end 324 in the second direction and connected to the plate-shaped part 301 will be called a second other end of the second case 32. The second flange portion 382 constitutes an end of the second spool 380 arranged to face the second other end of the second case 32 when the second spool 380 is accommodated in the second housing section 32A. The second flange portion 382 is a plate-shaped portion that is circular in a side view and that extends radially outward from the shaft portion 381 at a right end thereof. The second flange portion 382 has an outer diameter that corresponds to the inner diameter of the second main body 321, i.e., the diameter of the cylindrical-shaped second housing section 32A. In the present embodiment, the outer diameter of the second flange portion 382 is slightly smaller than the inner diameter of the second main body 321, and the difference between the outer diameter of the second flange portion 382 and the inner diameter of the second main body 321 is about 0.1 millimeters. With this structure, the second spool 380 is positioned relative to the second case 32 so that the axial center 38C of the second spool 380 housed in the second housing section 32A is aligned with the center of the second main body 321. The second spool 380 is disposed in the second housing section 32A such that the second spool 380 is rotatable about the axial center 38C. A cylindrical portion 388 is a cylindrical-shaped member that protrudes rightward from the right surface of the second flange portion 382.

Figure 7:
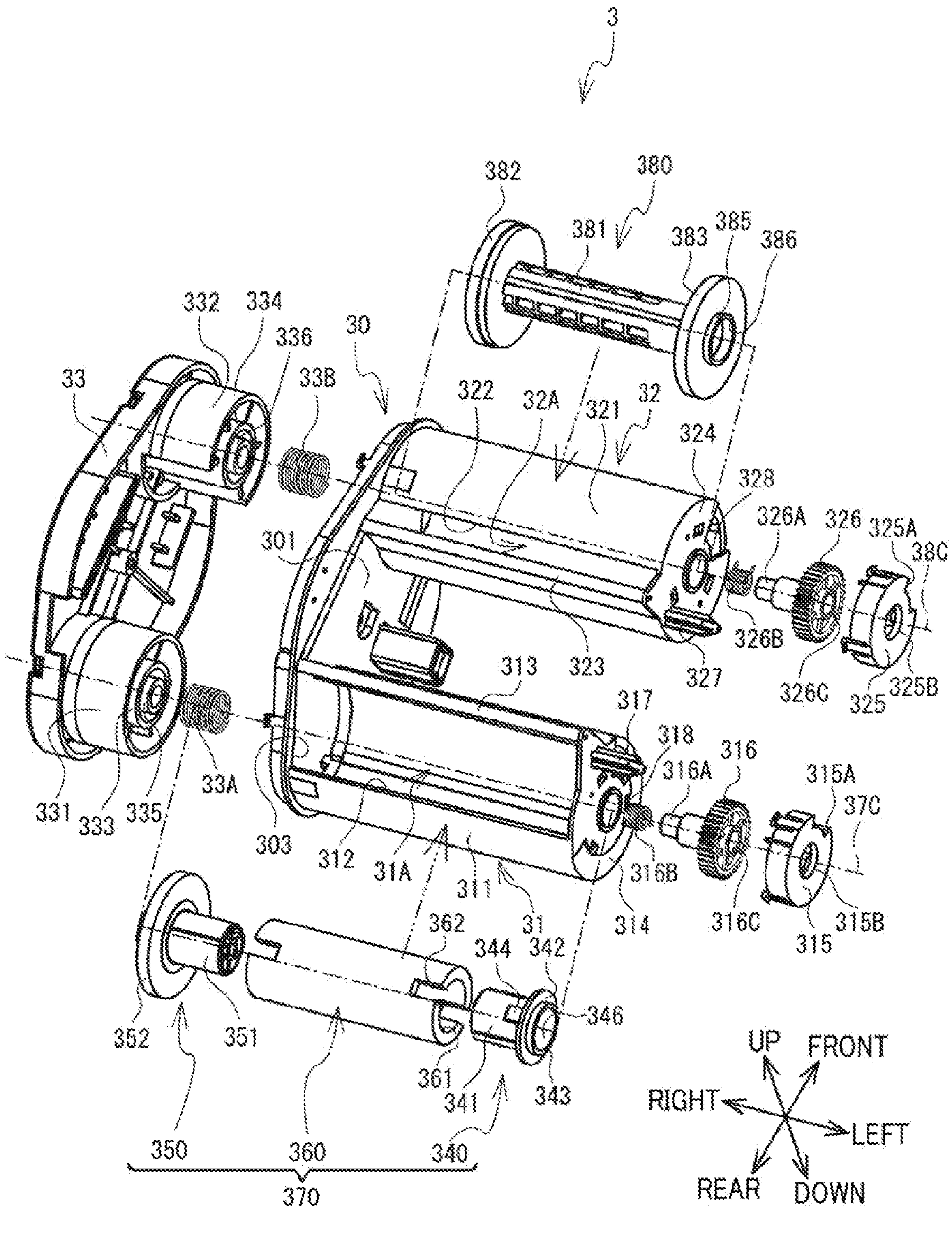
FIG. 7 is an exploded perspective view of the ink ribbon cartridge 3 as viewed from a diagonally left-rear side thereof.
Figure 8:
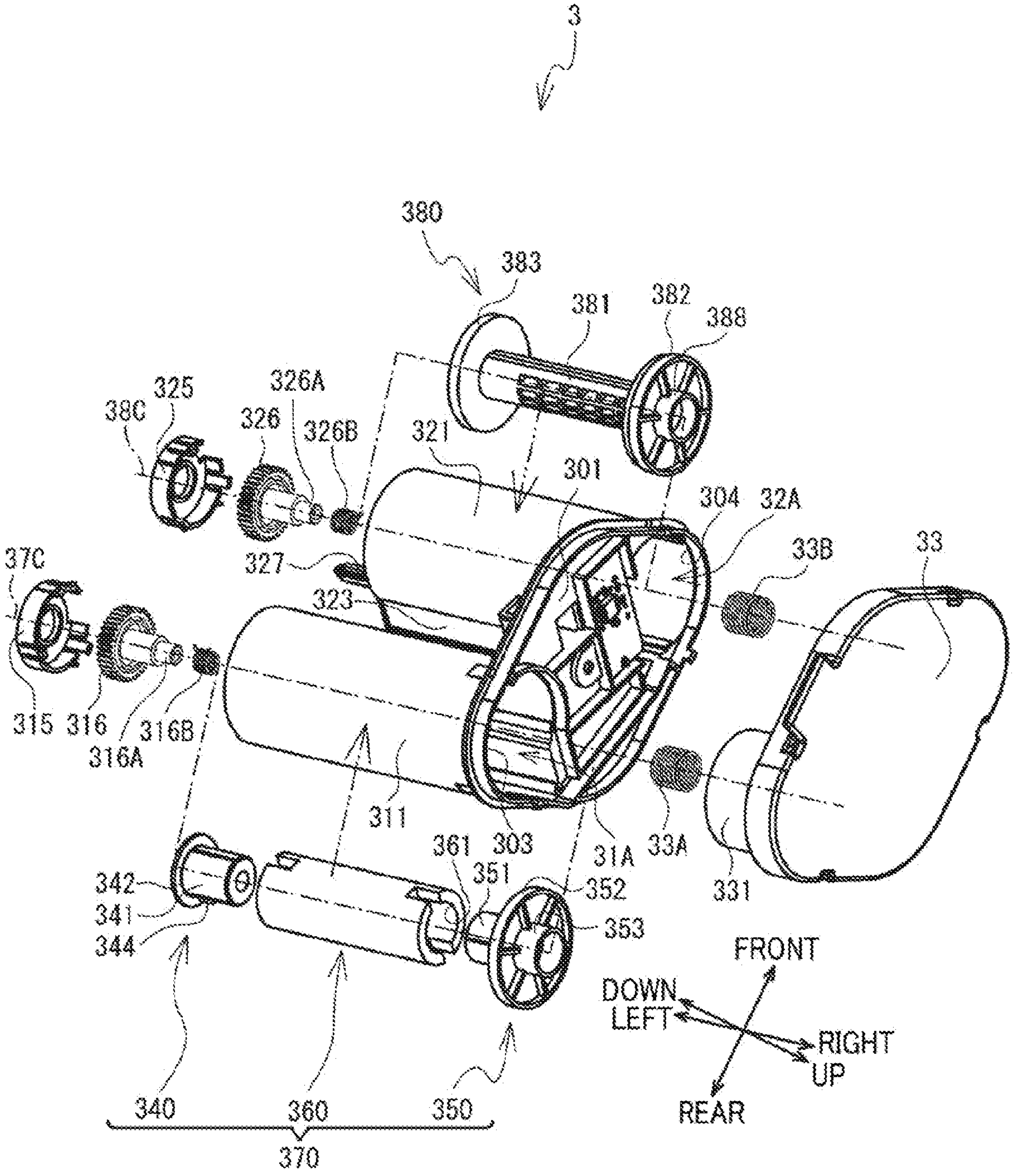
FIG. 8 is an exploded perspective view of the ink ribbon cartridge 3 as viewed from a diagonally lower-right side thereof.

As illustrated in FIGS. 7 and 8, the plate-shaped part 301 is provided at the right end of the case 30. The plate-shaped part 301 has a general parallelogram shape in a side view and extends in the up-down direction. The plate-shaped part 301 has a lower-rear end connected to the right end of the first main body 311, and an upper-front end connected to the right end of the second main body 321. The plate-shaped part 301 has openings 303 and 304 at positions corresponding to positions at which the first main body 311 and second main body 321 are connected, respectively. The openings 303 and 304 have the same shapes as the first main body 311 and second main body 321, and penetrate the plate-shaped part 301 in the left-right direction. The opening 303 communicates with the first housing section 31A. The opening 304 communicates with the second housing section 32A.

A first cap 331 and a second cap 332 are provided on a left surface of the case cover 33. The first cap 331 has a cylindrical shape that protrudes leftward along the axial center 37C from a rear portion on the left surface of the case cover 33 to have an open left end. The first cap 331 has an outer diameter that is approximately the same as inner diameters of the opening 303 and the first housing section 31A. A first support shaft 335 and a cylindrical part 333 are provided inside the first cap 331. The first support shaft 335 protrudes leftward along the axial center 37C from a center on the inner bottom of the first cap 331. The cylindrical part 333 is a cylindrical-shaped member that protrudes leftward along the axial center 37C on the outside of the first support shaft 335. The second cap 332 has a generally cylindrical shape that protrudes leftward along the axial center 38C from a front portion on the left surface of the case cover 33 to have an open left end. The second cap 332 has an outer diameter that is approximately the same as inner diameters of the opening 304 and the second housing section 32A. A second support shaft 336 and a cylindrical part 334 are provided inside the second cap 332. The second support shaft 336 protrudes leftward along the axial center 38C from a center on the inner bottom of the second cap 332. The cylindrical part 334 is a cylindrical-shaped member that protrudes leftward along the axial center 38C on the outside of the second support shaft 336. Coil springs 33A and 33B are fitted over the first support shaft 335 and second support shaft 336, respectively.

The case cover 33 is attached to the case 30 with the first spool 370 housed in the first housing section 31A and the second spool 380 housed in the second housing section 32A. The first cap 331 is inserted in the opening 303 of the first main body 311 of the first housing section 31A that accommodates the first spool 370 therein. The cylindrical portion 353 of the first flange portion 352 is inserted between the cylindrical part 333 and the first support shaft 335 of the first cap 331, with the coil spring 33A disposed inside the cylindrical portion 353 in a slightly compressed state. The coil spring 33A has a right end in contact with an inner surface of the cylindrical portion 353, thereby pressing the cylindrical portion 353 leftward. A rotational load acting on the first spool 370 due to pressing of the coil spring 33A on the cylindrical portion 353 leftward is smaller than a torque acting on the first spool 370 by the rotation of the first gear 316. Therefore, the first flange portion 352 is supported, via the coil spring 33A, so as to be rotatable relative to the first cap 331.

The second cap 332 is inserted in the opening 304 of the second main body 321 while the second housing section 32A accommodates the second spool 380 therein. The cylindrical portion 388 of the second flange portion 382 is inserted between the cylindrical part 334 and the second support shaft 336 of the second cap 332, with the coil spring 33B disposed inside the cylindrical portion 388 in a slightly compressed state. The coil spring 33B has a right end in contact with an inner surface of the cylindrical portion 388, thereby pressing the cylindrical portion 388 leftward. A rotational load acting on the second spool 380 due to pressing of the coil spring 33B on the cylindrical portion 388 leftward is smaller than a torque acting on the second spool 380 by the rotation of the second gear 326. Therefore, the second flange portion 382 is supported, via the coil spring 33B, so as to be rotatable relative to the second cap 332.

Detailed structures of the first end 314 of the first case 31 and the second end 324 of the second case 32 will be described with reference to FIG. 9. As illustrated in a region W1 of FIG. 9, the first end 314 includes a cylindrical-shaped first case rib 319. The first case rib 319 protrudes in the first direction toward the inside of the first main body 311 from the right surface of the first end 314. The first case rib 319 has an inner periphery that is continuous with an inner periphery of the hole 318. The first case rib 319 has an outer diameter that is approximately the same as the inner diameter of the first spool rib 343. Accordingly, the first spool rib 343 is fitted over the outer periphery of the first case rib 319 in a state where the first spool 370 is housed in the first housing section 31A and the case cover 33 is attached to the case 30. In this way, the first spool 370 is positioned relative to the first case 31 such that the axial center 37C of the first spool 370 accommodated in the first housing section 31A is aligned with the center of the first main body 311. Since the first spool rib 343 is fitted with the first case rib 319 such that the first spool rib 343 is slidably movable relative to the first case rib 319, the axial center 37C is positioned at the center of the first main body 311 even when the first spool 370 rotates about the axial center 37C.

As illustrated in a region W2 region of FIG. 9, the second end 324 includes a cylindrical-shaped second case rib 329. The second case rib 329 protrudes in the second direction toward the inside of the second main body 321 from the right surface of the second end 324. The second case rib 329 has an inner periphery that is continuous with an inner periphery of the hole 328. The second case rib 329 has an outer diameter that is approximately the same as the inner diameter of the second spool rib 385. Accordingly, the second spool rib 385 is fitted over the outer periphery of the second case rib 329 in a state where the second spool 380 is accommodated in the second housing section 32A and the case cover 33 is attached to the case 30. As a result, the second spool 380 is positioned relative to the second case 32 such that the axial center 38C of the second spool 380 accommodated in the second housing section 32A is aligned with the center of the second main body 321. Since the second spool rib 385 is fitted over the second case rib 329 such that the second spool rib 385 is slidably movable relative to the second case rib 329, the axial center 38C is positioned at the center of the second main body 321 even when the second spool 380 rotates about the axial center 38C.

Figure 10:
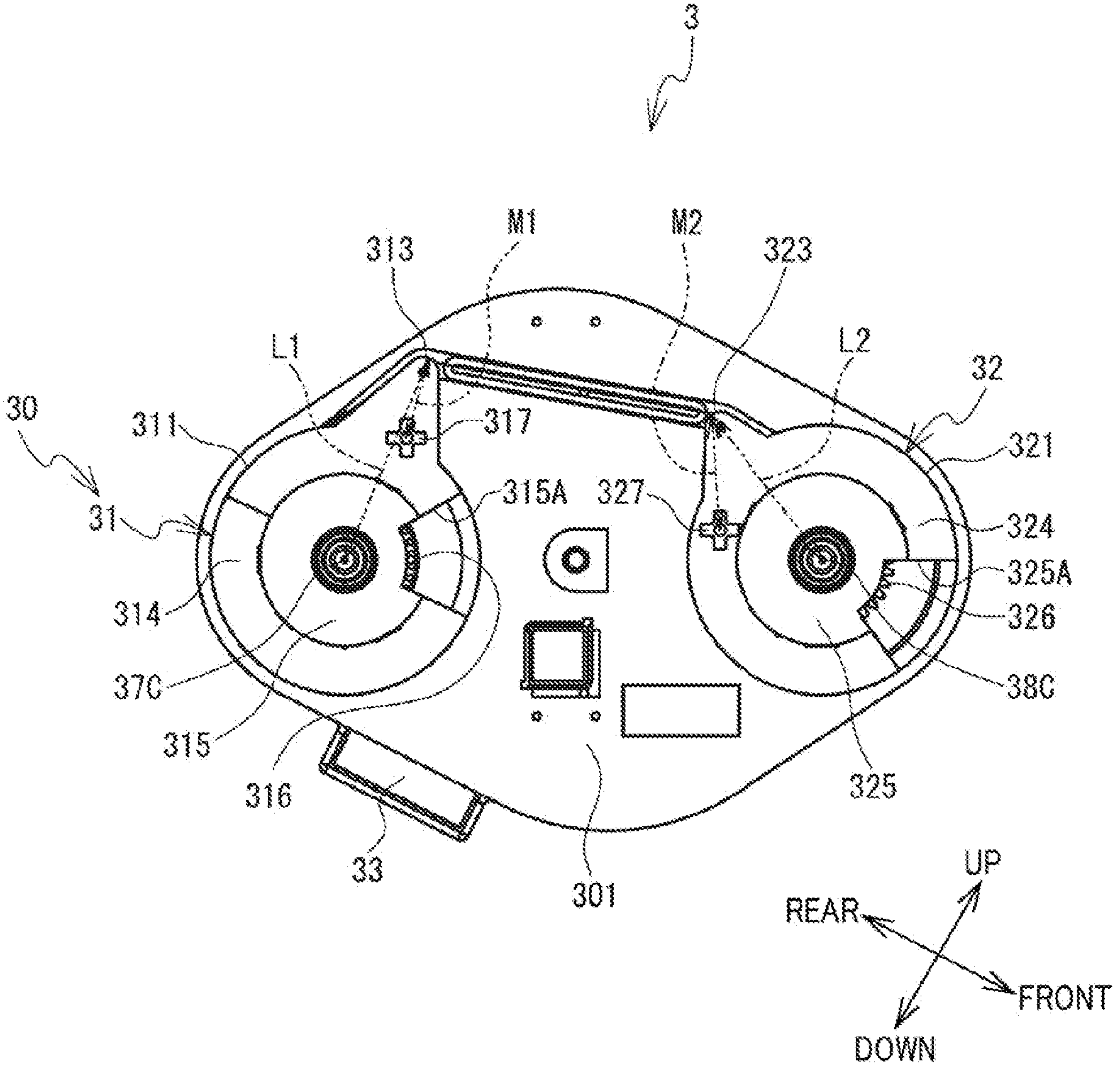
FIG. 10 is a left side view of the ink ribbon cartridge 3.

Referring to FIG. 10, arrangements of the first protrusion 317 on the first end 314 of the first case 31 and the second protrusion 327 on the second end 324 of the second case 32 will be described in a left side view where the ink ribbon cartridge 3 is viewed in a direction parallel to the first direction and the second direction. When the ink ribbon cartridge 3 is attached to the cartridge attachment portion 27 of the housing 2, the first protrusion 317 is fitted in the first hole 73 at the opposing surface 7A of the first frame 7 illustrated in FIGS. 3 through 5. The first protrusion 317 has a diameter that is approximately the same as the diameter of the first hole 73 of the opposing surface 7A of the first frame 7. In a left side view, a length M1 between a distal end of the first rib 313 and the first protrusion 317 is shorter than a length L1 between the distal end of the first rib 313 and the axial center 37C.

When the ink ribbon cartridge 3 is attached to the cartridge attachment portion 27 of the housing 2, the second protrusion 327 is fitted in the second hole 74 at the opposing surface 7A of the first frame 7. The second protrusion 327 has a diameter that is approximately the same as the diameter of the second hole 74 at the opposing surface 7A of the first frame 7. Similarly, in a left side view, a length M2 between a distal end of the second rib 323 and the second protrusion 327 is shorter than a length L2 between the distal end of the second rib 323 and the axial center 38C.

A method of attaching the ink ribbon cartridge 3 to the cartridge attachment portion 27 and a printing operation in the printing device 1 will be described. To ensure good printing quality with the printing device 1, the ink ribbon cartridge 3 needs to be positioned so as not to deviate relative to the housing 2 during a printing operation so that the ink ribbon 39 to be conveyed can be arranged stably inside the housing 2. A user inserts the first end 314 of the first case 31 and the second end 324 of the second case 32 into the cartridge insertion hole 26 of the right wall 2R of the housing 2 to attach the ink ribbon cartridge 3 to the cartridge attachment portion 27. In the ink ribbon cartridge 3, the ink ribbon 39, whose one end is fixed to the first spool 370 and whose another end is fixed to the second spool 380, is arranged to extend over the first spool 370, the first rib 313, the second rib 323, and the second spool 380 sequentially. Due to the first rib 313 and the second rib 323, tension is applied to the ink ribbon 39 spanning between the first spool 370 and the first rib 313, between the first rib 313 and the second rib 323, and between the second rib 323 and the second spool 380, so that the ink ribbon 39 can be conveyed smoothly. The ink ribbon 39 spanning between the first rib 313 and the second rib 323 constitutes the parallelly moving portion of the ink ribbon 39, which is accommodated in the interior of the housing 2 via the opening connecting part 263 of the cartridge insertion hole 26 and arranged between the platen roller 4 and the print head 50.

As the first end 314 of the first case 31 approaches the first frame 7, the first shaft 77 of the opposing surface 7A is inserted into the recess 316C of the first gear 316 from its left side through the through-hole 315B of the first gear cover 315. As the second end 324 of the second case 32 approaches the first frame 7, the second shaft 78 of the opposing surface 7A is inserted into the recess 326C of the second gear 326 from its left side through the through-hole 325B of the second gear cover 325. In this way, the first end 314 of the first case 31 and the second end 324 of the second case 32 are guided to face the opposing surface 7A in a generally perpendicular fashion. As the user presses the ink ribbon cartridge 3 farther leftward, the first protrusion 317 on the first end 314 and the second protrusion 327 on the second end 324 are fitted respectively into the first hole 73 and the second hole 74 in the opposing surface 7A. Accordingly, the first end 314 of the first case 31 and the second end 324 of the second case 32 are fixed to the first frame 7 with the first end 314 and the second end 324 fixed in position with reference to the positions of the first hole 73 and the second hole 74. Incidentally, the opening 83 of the second frame 8 is open to have a larger size than the cartridge insertion hole 26. Therefore, in a case where the ink ribbon cartridge 3 is mounted and removed relative to the cartridge attachment portion 27 through the cartridge insertion hole 26, the ink ribbon cartridge 3 does not come into contact with the opening 83, thereby preventing damage to the ink ribbon cartridge 3.

The length of the first main body 311 in the first direction and the length of the second main body 321 in the second direction are both approximately the same as the length between the first frame 7 and the second frame 8. Therefore, a portion of the first main body 311 adjacent to the plate-shaped part 301 fits in the first opening 261 of the cartridge insertion hole 26 and a portion of the second main body 321 adjacent to the plate-shaped part 301 fits in the second opening 262 of the cartridge insertion hole 26. In other words, the first other end of the first case 31 is supported while being fixed in position by the first opening 261, and the second other end of the second case 32 is supported while being fixed in position by the second opening 262. In this state, the first gear 75 provided on the opposing surface 7A meshes with the first gear 316 exposed through the notch 315A of the first gear cover 315. The second gear 76 provided on the opposing surface 7A meshes with the second gear 326 exposed through the notch 325A of the second gear cover 325. The parallelly moving portion of the ink ribbon 39 spanning between the first rib 313 and the second rib 323 is arranged between the platen roller 4 and the print head 50.

The user operates the operating part 6B of the lever member 6 to pinch the respective parallelly moving portions of the ink ribbon 39 and the printing medium M between the platen roller 4 and the support part 51. At this time, the platen roller 4 contacts the printing medium M from above while the print head 50 contacts the ink ribbon 39 from below. Further, the print head 50 supported on the support part 51 is urged toward the platen roller 4 by the elastic force of the pair of springs 57. As described above, the center 4C of the first support shaft 41 supporting the platen roller 4 and the center 5C of the second support shaft 52 supporting the printing unit 5 are maintained in parallel to each other.

The user performs an input operation on the switches 21 to start a printing operation. The printing device 1 begins the printing operation. A control unit (not illustrated) of the printing device 1 controls the drive unit to convey the printing medium M. The control unit also drives the motor 79. The first gear 75 and the second gear 76 rotate in response to the drive of the motor 79. In the present embodiment, when the platen roller 4 rotates forward, the control unit rotates the motor 79 forward and the second gear 76 rotates accordingly. In response to the rotation of the second gear 76, the second gear 326 rotates. Due to the elastic force of the torsion spring 326B generated in response to the rotation of the second gear 326, the second spool 380 rotates with a constant torque. As a result, the ink ribbon 39 is paid out from the first spool 370, conveyed between the first rib 313 and the second rib 323, and wound over the second spool 380. Incidentally, when the platen roller 4 rotates in reverse, the control unit rotates the motor 79 in reverse, and the first gear 75 rotates accordingly. In response to the rotation of the first gear 75, the first gear 316 rotates. Due to the elastic force of the torsion spring 316B generated in response to the rotation of the first gear 316, the first spool 370 rotates at a constant torque. As a result, the ink ribbon 39 is paid out from the second spool 380, conveyed between the second rib 323 and the first rib 313, and wound over the first spool 370.

When the ink ribbon 39 is conveyed, a load is intermittently applied to the first rib 313 toward the axial center 37C of the first spool 370 in accordance with the tension generated in the ink ribbon 39. A load is also applied intermittently to the second rib 323 toward the axial center 38C of the second spool 380 in accordance with the tension generated in the ink ribbon 39. As described above, the length M1 is shorter than the length L1. Further, the length M2 is shorter than the length L2. In other words, the first protrusion 317 is supported in the first hole 73 of the first frame 7 at a position closer to the first rib 313 than the axial center 37C is to the first rib 313 when viewed in the first direction. The second protrusion 327 is supported in the second hole 74 of the first frame 7 at a position closer to the second rib 323 than the axial center 38C is to the second rib 323 when viewed in the second direction. Accordingly, the first end 314 of the first case 31 and the second end 324 of the second case 32 are stably supported on the first frame 7, even when intermittent loads are applied to the first rib 313 and the second rib 323 by the conveyance of the ink ribbon 39.

At the first end 314 of the first case 31, the first spool rib 343 of the first spool 370 is fitted over the outer periphery of the first case rib 319. At the second end 324 of the second case 32, the second spool rib 385 of the second spool 380 is fitted over the outer periphery of the second case rib 329. Further, at the first other end of the first case 31, the outer diameter of the first flange portion 352 on the first spool 370 corresponds to the diameter of the first housing section 31A. At the second other end of the second case 32, the outer diameter of the second flange portion 382 on the second spool 380 corresponds to the diameter of the second housing section 32A. Therefore, the position of the first spool 370 that is rotatable about the axial center 37C is stabilized inside the first housing section 31A. Similarly, the position of the second spool 380 that is rotatable about the axial center 38C is stabilized inside the second housing section 32A. The control unit heats the print head 50 while conveying the printing medium M and the ink ribbon 39. As a result, the ink ribbon 39 is heated and ink is transferred onto the printing medium M. The printing medium M on which ink has been transferred is discharged from the discharge part 22.

As described above, the first protrusion 317 provided on the first end 314 of the first case 31 in the ink ribbon cartridge 3 engages with the first hole 73 in the opposing surface 7A of the first frame 7 when the ink ribbon cartridge 3 is attached to the cartridge attachment portion 27 of the housing 2. Further, the second protrusion 327 provided on the second end 324 of the second case 32 engages with the second hole 74 in the opposing surface 7A. With this configuration, the first end 314 of the first case 31 and the second end 324 of the second case 32 are fixed to the first frame 7 while being fixed in position with reference to the positions of the first hole 73 and second hole 74. Therefore, the ink ribbon cartridge 3 can realize improved accuracy in positioning thereof inside the cartridge attachment portion 27 of the housing 2, without increasing the number of parts in the printing device 1.

When viewed in the first direction, the length M1 between the distal end of the first rib 313 and the first protrusion 317 is shorter than the length L1 between the distal end of the first rib 313 and the axial center 37C. When viewed in the second direction, the length M2 between the distal end of the second rib 323 and the second protrusion 327 is shorter than the length L2 between the distal end of the second rib 323 and the axial center 38C. In other words, the first protrusion 317 provides positioning of the first end 314 at the first hole 73 in the first frame 7 at a position closer to the first rib 313 than the axial center 37C is to the first rib 313 when viewed in the first direction. The second protrusion 327 provides positioning of the second end 324 at the second hole 74 in the first frame 7 at a position closer to the second rib 323 than the axial center 38C is to the second rib 323 when viewed in the second direction. Therefore, the first end 314 and the second end 324 are stably supported on the first frame 7, even when loads are intermittently applied to the first rib 313 and the second rib 323, respectively, due to the conveyance of the ink ribbon 39.

The first other end of the first case 31 is fitted in the first opening 261 of the cartridge insertion hole 26 in the side plate portion 25 while the first protrusion 317 is fitted in the first hole 73 to provide positioning of the first end 314 of the first case 31 relative to the first hole 73 in the first frame 7. The second other end of the second case 32 is fitted in the second opening 262 of the cartridge insertion hole 26 while the second protrusion 327 is fitted in the second hole 74 to provide the positioning of the second end 324 of the second case 32 relative to the second hole 74 of the first frame 7. In other words, when the ink ribbon cartridge 3 is attached to the cartridge attachment portion 27, the first case 31 and the second case 32 are fixed in position relative to the printing device 1 both at the ends facing the first frame 7 and at the ends facing the side plate portion 25. Accordingly, the ink ribbon cartridge 3 can stabilize the position of the ink ribbon 39 relative to the printing device 1, even in a case where the ink ribbon 39 has a wider width, for example.

Since the outer diameter of the first flange portion 352 on the first spool 370 corresponds to the inner diameter of the first main body 311 in the first case 31, the axial center 37C of the first spool 370 can be stabilized in position relative to the first case 31. Similarly for the second spool 380, since the outer diameter of the second flange portion 382 corresponds to the inner diameter of the second main body 321 in the second case 32, the axial center 38C of the second spool 380 can be stabilized in position relative to the second case 32. Accordingly, the first spool 370 and the second spool 380 are less likely to get deviated relative to the ink ribbon cartridge 3, even when the first spool 370 and the second spool 380 are to perform operations to take up the ink ribbon 39 or the like.

The first spool rib 343 protrudes in the first direction from the circular flange 342 provided at the end of the first spool 370 facing the first end 314 of the first case 31. The first case rib 319 protrudes in the first direction toward the inside of the first main body 311 from the right surface of the first end 314. By fitting the first spool rib 343 over the outer periphery of the first case rib 319, the first spool 370 is positioned relative to the first case 31 such that the axial center 37C of the first spool 370 accommodated in the first housing section 31A is disposed at the center of the first main body 311. The second spool rib 385 protrudes in the second direction from the gear connecting portion 383 provided at the end of the second spool 380 facing the second end 324 of the second case 32. The second case rib 329 protrudes in the second direction toward the inside of the second main body 321 from the right surface of the second end 324. By fitting the second spool rib 385 over the outer periphery of the second case rib 329, the second spool 380 is positioned relative to the second case 32 such that the axial center 38C of the second spool 380 accommodated in the second housing section 32A is disposed at the center of the second main body 321. Therefore, the positions of the first spool 370 and the second spool 380 inside the ink ribbon cartridge 3 are stable during printing operations.

Since the first frame 7 is made of metal, the first hole 73 and the second hole 74 are precisely positioned in the opposing surface 7A of the first frame 7. Therefore, the ink ribbon cartridge 3 is precisely positioned relative to the cartridge attachment portion 27.

The first support shaft 41 supporting the platen roller 4 and the second support shaft 52 supporting the printing unit 5 are arranged in parallel to each other by fitting the first support shaft 41 in the first shaft holes 71 and 81 provided in the first frame 7 and the second frame 8, and by fitting the second support shaft 52 in the second shaft holes 72 and 82 provided in the first frame 7 and the second frame 8. The connecting member 9 connecting the bottom portions of the first frame 7 and the second frame 8 has a lower rigidity than the first frame 7 and the second frame 8. Even if the first shaft hole 81 and the second shaft hole 82 of the second frame 8 are arranged not to directly oppose the first shaft hole 71 and the second shaft hole 72 of the first frame 7 but to be offset therefrom, the first support shaft 41 and the second support shaft 52 are maintained in a parallel state through elastic deformation of the connecting member 9. Therefore, the printing device 1 can accurately maintain the positional relationship between the platen roller 4 and the print head 50 inside the housing 2 to ensure good printing quality.

In the above-described embodiment, the ink ribbon cartridge 3 is an example of an "ink ribbon cartridge" of the present disclosure. The ink ribbon 39 is an example of an "ink ribbon" of the present disclosure. The first case 31 is an example of a "first case" of the present disclosure. The first rib 313 is an example of a "first rib" of the present disclosure. The first end 314 is an example of a "first end" of the present disclosure. The first protrusion 317 is an example of a "first protrusion" of the present disclosure. The first case rib 319 is an example of a "first case rib" of the present disclosure. The second case 32 is an example of a "second case" of the present disclosure. The second rib 323 is an example of a "second rib" of the present disclosure. The second end 324 is an example of a "second end" of the present disclosure. The second protrusion 327 is an example of a "second protrusion" of the present disclosure. The second case rib 329 is an example of a "second case rib" of the present disclosure. The first spool 370 is an example of a "first spool" of the present disclosure. The first flange portion 352 is an example of a "first flange portion" of the present disclosure. The first spool rib 343 is an example of a "first spool rib" of the present disclosure. The second spool 380 is an example of a "second spool" of the present disclosure. The second flange portion 382 is an example of a "second flange portion" of the present disclosure. The second spool rib 385 is an example of a "second spool rib" of the present disclosure. The printing device 1 is an example of a "printing device" of the present disclosure. The side plate portion 25 is an example of a "side plate portion" of the present disclosure. The first opening 261 is an example of a "first opening" of the present disclosure. The second opening 262 is an example of a "second opening" of the present disclosure. The first frame 7 is an example of a "first frame" of the present disclosure. The first hole 73 is an example of a "first hole" of the present disclosure. The second hole 74 is an example of a "second hole" of the present disclosure. The second frame 8 is an example of a "second frame" of the present disclosure. The connecting member 9 is an example of a "connecting member" of the present disclosure. The platen roller 4 is an example of a "platen roller" of the present disclosure. The first support shaft 41 is an example of a "first support shaft" of the present disclosure. The print head 50 is an example of a "print head" of the present disclosure. The second support shaft 52 is an example of a "second support shaft" of the present disclosure. The first shaft holes 71, 81 are examples of a "third shaft hole" of the present disclosure. The second shaft holes 72, 82 are examples of a "fourth shaft hole" of the present disclosure.

The present disclosure is not limited to the above embodiment, and various modifications may be made within a scope that does not depart from the gist of the disclosure. For example, the first direction and second direction need not be parallel to each other. Accordingly, the axial center 37C and the axial center 38C may extend in directions that intersect each other.

In the above embodiment, the first spool 370 is configured by three members, i.e., the shaft portion 360, the flange portion 350, and the gear connecting portion 340 assembled as one unit. The first spool 370 may be configured of two or four or more members, or may be configured of a single member. Similarly, the second spool 380 may be configured of a plurality of members combined together as in the first spool 370.

At least the outer diameter of the first flange portion 352, which is provided on the end of the first spool 370 positioned to face the first other end of the first case 31 in the first housing section 31A, should correspond to the inner diameter of the first main body 311. At least the outer diameter of the second flange portion 382, which is provided on the end of the second spool 380 positioned to face the second other end of the second case 32 in the second housing section 32A, should correspond to the inner diameter of the second main body 321. Therefore, as with the first flange portion 352, the outer diameter of the circular flange 342 constituting the end of the first spool 370 positioned to face the first end 314 in the first housing section 31A may correspond to the inner diameter of the first main body 311. The outer diameter of the gear connecting portion 383 constituting the end of the second spool 380 positioned to face the second end 324 in the second housing section 32A need not correspond to the inner diameter of the second main body 321 but may be smaller than the inner diameter of the second main body 321.

The outer diameter of the first flange portion 352 should correspond in size to the inner diameter of the first main body 311 and be of a size that allows the first spool 370 to rotate smoothly about the axial center 37C when the first spool 370 is housed in the first housing section 31A. Accordingly, the outer diameter of the first flange portion 352 and the inner diameter of the first main body 311 should be approximately the same as each other so that the outer periphery of the first flange portion 352 can slide along the inner wall of the first main body 311 when the first spool 370 rotates about the axial center 37C. Similarly, the outer diameter of the second flange portion 382 should correspond in size to the inner diameter of the second main body 321 and be of a size that allows the second spool 380 to rotate smoothly about the axial center 38C when the second spool 380 is housed in the second housing section 32A. Therefore, the outer diameter of the second flange portion 382 and the inner diameter of the second main body 321 should be approximately the same as each other so that the outer periphery of the second flange portion 382 can slide along the inner wall of the second main body 321 when the second spool 380 rotates about the axial center 38C.

The first flange portion 352 need not be perfectly circular when viewed in the first direction. For example, the first flange portion 352 may have a circular shape with a notch formed in a portion of the circle when viewed in the first direction. As far as the outer diameter of the first flange portion 352 defined by a non-notched portion of the first flange portion 352 corresponds to the inner diameter of the first main body 311, the axial center 37C of the first spool 370 will be stably positioned relative to the first case 31. The same applies to the second flange portion 382. The first housing section 31A defined by the inner wall of the first main body 311 also need not be perfectly circular when viewed in the first direction. For example, a notch may be formed in a portion of the first main body 311. Further, three or more ribs extending in the first direction may be provided on the inner wall of the first main body 311, and the inner diameter of the first main body 311 may be defined by these three or more ribs. In a case where the outer diameter of the first flange portion 352 corresponds to the inner diameter of the first main body 311 defined by the three or more ribs, the axial center 37C of the first spool 370 can be stably positioned relative to the first case 31. In this case, the inner diameter of the first main body 311 is easier to manage. The same may be applied to the second housing section 32A and the second main body 321.

In the printing device 1 according to the above embodiment, the first frame 7 and the second frame 8 are made of different materials from the connecting member 9, so that the connecting member 9 has a lower rigidity than the first frame 7 and the second frame 8. The first frame 7 and the second frame 8 may be made of the same material as the connecting member 9, and the rigidity of the connecting member 9 may be made lower than the rigidity of the first frame 7 and the second frame 8 through a design involving thicknesses and shapes of the structures or composition and processing of the materials, for example.

What is claimed is:

1. An ink ribbon cartridge attachable to a printing device including a first frame, the ink ribbon cartridge comprising:

a first spool extending in a first direction;

a first case covering the first spool, the first case having a first end and a first other end opposite the first end in the first direction;

a second spool extending in a second direction;

a second case covering the second spool, the second case having a second end and a second other end opposite the second end in the second direction;

a first rib provided at the first case;

a second rib provided at the second case;

an ink ribbon having one end wound over the first spool and another end wound over the second spool, the ink ribbon being arranged to extend, from the one end to the another end, sequentially over the first spool, the first rib, the second rib, and the second spool;

a first protrusion protruding in the first direction from the first end of the first case, the first protrusion being fitted in a first hole of the first frame inside the printing device in a state where the ink ribbon cartridge is attached to the printing device; and a second protrusion protruding in the second direction from the second end of the second case, the second protrusion being fitted in a second hole of the first frame in the state where the ink ribbon cartridge is attached to the printing device.

2. The ink ribbon cartridge according to claim 1, wherein, when viewed in the first direction, a length between the first rib and the first protrusion is shorter than a length between an axial center of the first spool and the first rib, and wherein, when viewed in the second direction, a length between the second rib and the second protrusion is shorter than a length between an axial center of the second spool and the second rib.

3. The ink ribbon cartridge according to claim 1, wherein the printing device further includes a side plate portion arranged to face the first frame inside the printing device, wherein the first case has an outer diameter that corresponds to an inner diameter of a first opening formed in the side plate portion, wherein the second case has an outer diameter that corresponds to an inner diameter of a second opening formed in the side plate portion, wherein the first other end of the first case is fitted in the first opening in a state where the first protrusion is engaged in the first hole, and wherein the second other end of the second case is fitted in the second opening in a state where the second protrusion is engaged in the second hole.

4. The ink ribbon cartridge according to claim 1, wherein the first spool comprises a first flange portion provided at an end of the first spool arranged to face the first other end of the first case, the first flange portion protruding radially outward from the end of the first spool, wherein the second spool comprises a second flange portion provided at an end of the second spool arranged to face the second other end of the second case, the second flange portion protruding radially outward from the end of the second spool, wherein an outer diameter of the first flange portion corresponds to an inner diameter of the first case, and wherein an outer diameter of the second flange portion corresponds to an inner diameter of the second case.

5. The ink ribbon cartridge according to claim 1, wherein the first spool comprises a first spool rib protruding in the first direction from an end of the first spool arranged to face the first end of the first case, the first spool rib having a cylindrical shape centered on an axial center of the first spool, wherein the second spool comprises a second spool rib protruding in the second direction from an end of the second spool arranged to face the second end of the second case, the second spool rib having a cylindrical shape centered on an axial center of the second spool, wherein the first case comprises a first case rib having a cylindrical shape and protruding in the first direction toward an inside of the first case from the first end, wherein the second case comprises a second case rib having a cylindrical shape and protruding in the second direction toward an inside of the second case from the second end, wherein the first spool is positioned relative to the first case by fitting the first spool rib over an outer periphery of the first case rib, and wherein the second spool is positioned relative to the second case by fitting the second spool rib over an outer periphery of the second case rib.

6. The ink ribbon cartridge according to claim 1, wherein the first frame is made of metal, and wherein the first protrusion and the second protrusion are respectively engaged in the first hole and the second hole formed in the first frame in the state where the ink ribbon cartridge is attached to the printing device.

7. The printing device to which the ink ribbon cartridge according to claim 1 is attachable, the printing device comprising:

the first frame;

a first support shaft supporting a platen roller;

a second support shaft supporting a print head;

a second frame positioned to oppose the first frame; and a connecting member connecting the first frame and the second frame to each other, wherein each of the first frame and the second frame has a third hole and a fourth hole, ends of the first support shaft being fitted in the third holes and ends of the second support shaft being fitted in the fourth holes, the first support shaft and the second support shaft being arranged in parallel to each other by fitting the first support shaft in the respective third holes of the first frame and the second frame and by fitting the second support shaft in the respective fourth holes of the first frame and the second frame, and wherein a rigidity of the connecting member is lower than a rigidity of the first frame and the second frame.

8. The printing device according to claim 7, wherein the first frame and the second frame are made of metal.

9. The printing device according to claim 8, wherein the connecting member is made of resin.

10. The ink ribbon cartridge according to claim 1, wherein the second end of the second case is separate from the first end of the first case.

11. The ink ribbon cartridge according to claim 1, wherein the first case and the second case are positioned apart from each other, wherein the ink ribbon cartridge further comprises a connection plate connecting the first other end of the first case and the second other end of the second case with each other, wherein the first end of the first case and the second end of the second case are not connected with each other.

12. The ink ribbon cartridge according to claim 1, wherein, when viewed in the first direction, a length between an axial center of the first spool and the first protrusion is shorter than a length between the axial center of the first spool and the first rib, and wherein, when viewed in the second direction, a length between an axial center of the second spool and the second protrusion is shorter than a length between the axial center of the second spool and the second rib.

* * * * *